(12) United States Patent
Suzuki

(10) Patent No.: US 11,924,587 B2
(45) Date of Patent: Mar. 5, 2024

(54) DISPLAY METHOD, PROJECTOR, AND PROJECTION SYSTEM

(71) Applicant: SEIKO EPSON CORPORATION, Tokyo (JP)

(72) Inventor: Naoki Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 21 days.

(21) Appl. No.: 17/877,172

(22) Filed: Jul. 29, 2022

(65) Prior Publication Data

US 2023/0031848 A1 Feb. 2, 2023

(30) Foreign Application Priority Data

Jul. 30, 2021 (JP) .................. 2021-125870

(51) Int. Cl.
*H04N 9/31* (2006.01)
*G03B 21/14* (2006.01)

(52) U.S. Cl.
CPC ......... *H04N 9/3182* (2013.01); *H04N 9/3147* (2013.01); *H04N 9/3194* (2013.01)

(58) Field of Classification Search
CPC .. H04N 9/3147; H04N 9/3182; H04N 9/3194; G03B 21/14; G03B 21/147
See application file for complete search history.

(56) References Cited

U.S. PATENT DOCUMENTS

| 2007/0249396 A1 | 10/2007 | Nitta et al. |
| 2011/0181636 A1 | 7/2011 | Fukazawa |
| 2021/0409664 A1* | 12/2021 | Masuda ................. H04N 9/317 |

FOREIGN PATENT DOCUMENTS

| JP | H8-168039 A | 6/1996 |
| JP | 2002-94877 A | 3/2002 |
| JP | 2008-47406 A | 2/2008 |
| JP | 2010-102064 A | 5/2010 |
| JP | 2012-165091 A | 8/2012 |
| JP | 2014-211641 A | 11/2014 |
| JP | 2020-140145 A | 9/2020 |
| WO | WO2006/033245 A | 5/2008 |

OTHER PUBLICATIONS

A comparison of output times and post-correction impressions with video editing software and apps—19 pages.

* cited by examiner

*Primary Examiner* — Ryan D Howard
(74) *Attorney, Agent, or Firm* — Dority & Manning, P.A.

(57) ABSTRACT

A display method includes attenuating the brightness of an image corresponding to a superimposed area of a first image when the position of a projector is a reference position based on a first attenuation coefficient specified in accordance with the position in the superimposed area, calculating displacement information on displacement of the projector based on an output signal from an inertial sensor when the position of the projector is displaced from the reference position, obtaining a corrected first attenuation coefficient by correcting the first attenuation coefficient in accordance with the displacement information, and attenuating the brightness of the image corresponding to the superimposed area of the first image based on the corrected first attenuation coefficient when the position of the projector is displaced from the reference position.

6 Claims, 13 Drawing Sheets

DISPLAY METHOD, PROJECTOR, AND PROJECTION SYSTEM

The present application is based on, and claims priority from JP Application Serial Number 2021-125870, filed Jul. 30, 2021, the disclosure of which is hereby incorporated by reference herein in its entirety.

BACKGROUND

1. Technical Field

The present disclosure relates to a display method, a projector, and a projection system.

2. Related Art

When a plurality of projectors are used to perform multi-projection, and at least one of the projectors vibrates, the projection image projected by the vibrating projector shifts from those projected by the other projectors. To solve the problem described above, a technology for correcting the shift among the projected images is used in related art during the multi-projection.

For example, JP-A-2012-165091 discloses a multi-projection technology for allowing a plurality of projectors to each project a detection image for detecting a shift of the projection range. The technology described in JP-A-2012-165091 allows an image capturer to capture superimposed areas where the projection ranges of the projectors partially superimposed on each other with the detection images described above projected. A detector then detects the amount of shift between the projection images based on the image captured by the image capturer. Finally, according to the detected amount of shift, a shift corrector processes an image signal and shifts the projection ranges by predetermined amounts according to the result of the image signal processing.

In each of the superimposed areas, where two display images are combined with each other, the ratio in accordance with which the two display images are blended with each other is typically specified in advance. When a certain projector vibrates, the position of the superimposed area shifts from the original position of the superimposed area as a result of the vibration. The technology described in JP-A-2012-165091, however, can only shift the projection range by the amount according to the result of the image signal processing and can therefore display the display images in the shifted superimposed area, but the display images are displayed in the superimposed area in accordance with the blending ratio according to the original superimposed area. As a result, the display quality of the display images in the superimposed area deteriorate in some cases.

SUMMARY

A display method according to an aspect of the present disclosure is an image display method used by a projector that displays a first image on a display surface, the method including attenuating brightness of an image corresponding to a superimposed area of the first image when a position of the projector is a reference position, the superimposed area being an area where the first image and a second image displayed by another projector are partially superimposed on each other on the display surface, based on a first attenuation coefficient specified in accordance with a position in the superimposed area, correcting the first attenuation coefficient, when the position of the projector is displaced from the reference position, in accordance with displacement information on displacement of the projector, the displacement information calculated based on an output signal from an inertial sensor fixed to the projector, and attenuating the brightness of the image corresponding to the superimposed area of the first image based on the corrected first attenuation coefficient when the position of the projector is displaced from the reference position.

A projector according to another aspect of the present disclosure is a projector that displays a first image on a display surface, the projector including an attenuator that attenuates brightness of an image corresponding to a superimposed area of the first image when a position of the projector is a reference position, the superimposed area being an area where the first image and a second image displayed by another projector are partially superimposed on each other on the display surface, based on a first attenuation coefficient specified in accordance with a position in the superimposed area, and a corrector that corrects the first attenuation coefficient, when the position of the projector is displaced from the reference position, in accordance with displacement information on displacement of the projector, the displacement information calculated based on an output signal from an inertial sensor fixed to the projector, the attenuator attenuating the brightness of the image corresponding to the superimposed area of the first image based on the corrected first attenuation coefficient when the position of the projector is displaced from the reference position.

A projection system according to another aspect of the present disclosure is a projection system including a first projector that displays a first image on a display surface and a second projector that displays a second image on the display surface, the first projector including an attenuator that attenuates brightness of an image corresponding to a superimposed area of the first image when a position of the first projector is a reference position, the superimposed area being an area where the first image and the second image are partially superimposed on each other on the display surface, based on a first attenuation coefficient specified in accordance with a position in the superimposed area, and a corrector that corrects the first attenuation coefficient, when the position of the first projector is displaced from the reference position, in accordance with displacement information on displacement of the first projector, the displacement information calculated based on an output signal from an inertial sensor fixed to the first projector, the attenuator attenuating the brightness of the image corresponding to the superimposed area of the first image based on the corrected first attenuation coefficient when the position of the first projector is displaced from the reference position.

A projection system according to another aspect of the present disclosure is a projection system including a first projector that displays a first image on a display surface and a second projector that displays a second image on the display surface, the first projector including a first attenuator that attenuates brightness of an image corresponding to a superimposed area of the first image when a position of the first projector is a reference position, the superimposed area being an area where the first image and the second image are partially superimposed on each other on the display surface, based on a first attenuation coefficient specified in accordance with a position in the superimposed area, a calculator that calculates, when the position of the first projector is displaced from the reference position, position information on the position of the superimposed area in the display surface in accordance with displacement information on displacement of the first projector, the displacement information being calculated based on an output signal from an inertial sensor fixed to the first projector, an information output section that outputs the position information to the second projector, and a corrector that corrects the first attenuation coefficient in accordance with the displacement information, the first attenuator attenuating the brightness of the image corresponding to the superimposed area of the first image based on the corrected first attenuation coefficient when the position of the first projector is displaced from the reference position, the second projector including a second attenuator that attenuates brightness of an image corresponding to the superimposed area of the second image based on a second attenuation coefficient specified in accordance with a position in the superimposed area, an information acquirer that acquires the position information, and a corrector that corrects the second attenuation coefficient in accordance with the position information, and the second attenuator attenuating the brightness of the second image based on the corrected second attenuation coefficient.

DESCRIPTION OF EXEMPLARY EMBODIMENTS

Figure 1:
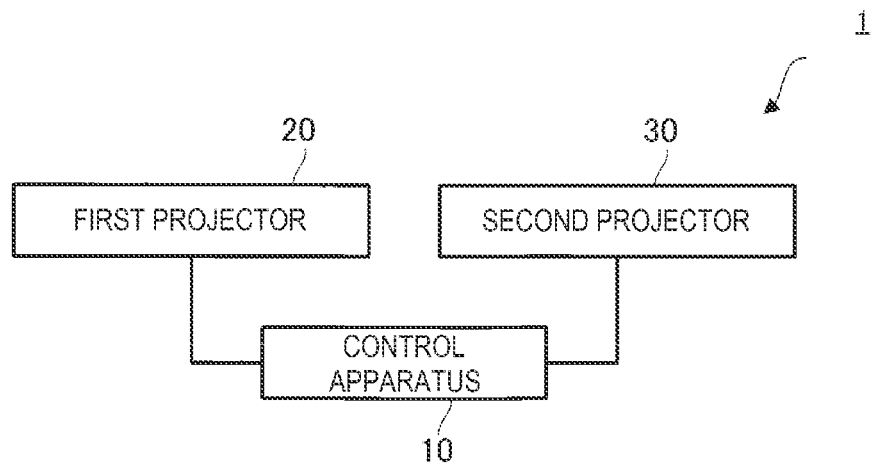
FIG. 1 is a block diagram showing an overall configuration of a projection system according to a first embodiment.

An image displaying method, a projector, and a projection system according to embodiments will be described below with reference to the drawings. It is noted that the dimensions and scale of each portion in the drawings differ from actual values as appropriate. A variety of technically preferable restrictions are imposed on the embodiments described below, which are preferable specific examples, and the scope of the present disclosure is, however, not limited to the embodiments unless the following description states that particular restrictions are imposed on the present disclosure.

1. First Embodiment 1-1. Overall Configuration

FIG. 1 is a block diagram showing an overall configuration of a projection system 1 according to a first embodiment. The projection system 1 includes a single control apparatus 10 and a plurality of projectors, a first projector 20 and a second projector 30. In the example shown in FIG. 1, the projection system 1 includes two projectors, the first projector 20 and a second projector 30, for simplicity of the description. The number of projectors provided in the projection system 1 is, however, not limited to two and may be three or more.

In the projection system 1, the control apparatus 10 controls the first projector 20 and the second projector 30. The control apparatus 10 divides one image substantially into two images and outputs the divided images to the first projector 20 and the second projector 30. The first projector 20 and the second projector 30 display display images by projecting the divided images onto a display surface. The display surface may, for example, be, but not limited to, a wall or a screen.

1-2. Configuration of Control Apparatus 10

Figure 2:
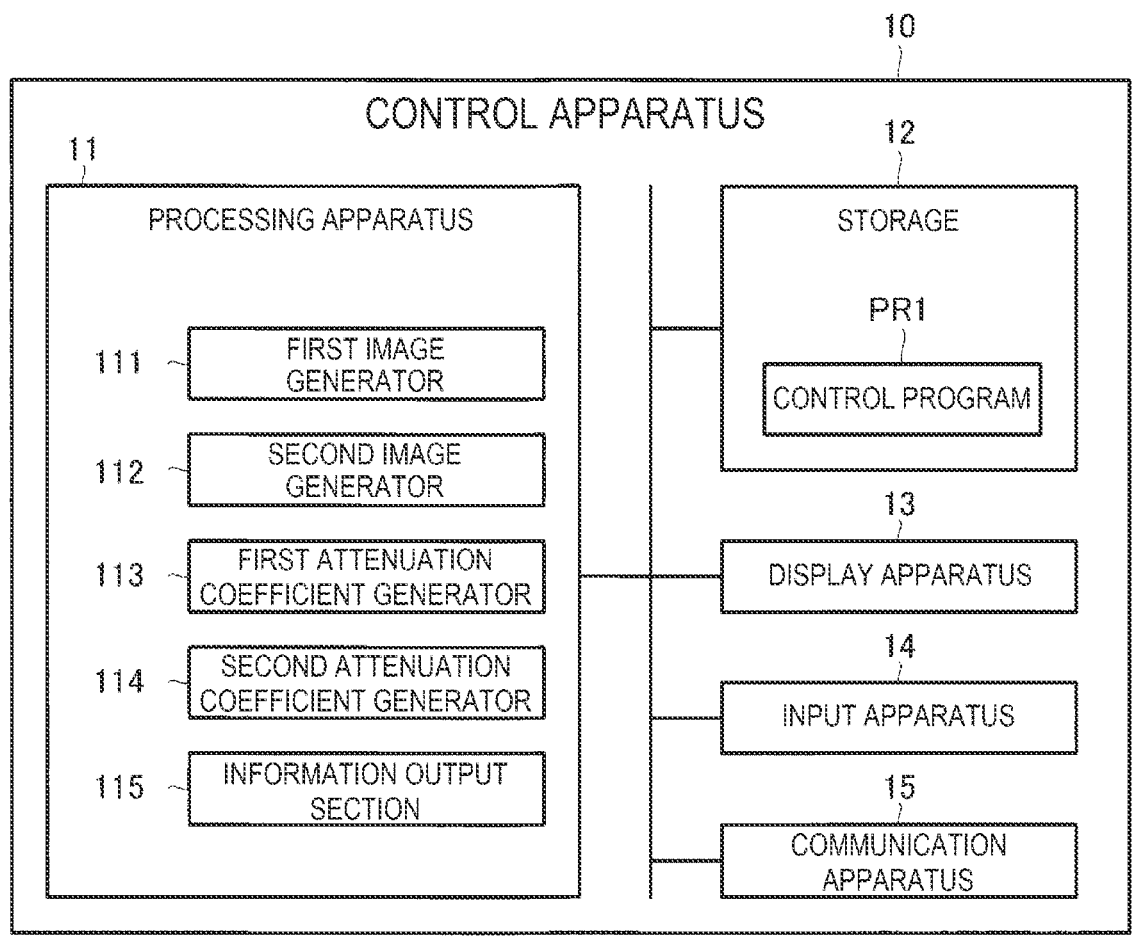
FIG. 2 is a block diagram showing an example of the configuration of a control apparatus.

FIG. 2 is a block diagram showing an example of the configuration of the control apparatus 10. The control apparatus 10 is a PC as a typical example, but not limited thereto, and can, for example, be a tablet terminal or a smartphone. The control apparatus 10 includes a processing apparatus 11, a storage 12, a display apparatus 13, an input apparatus 14, and a communication apparatus 15. The elements of the control apparatus 10 are connected to each other via a single bus or a plurality of buses for information communication.

The processing apparatus 11 is a processor that controls the entire control apparatus 10 and is formed, for example, of a single chip or a plurality of chips. The processing apparatus 11 is formed, for example, of a central processing unit (CPU) including interfaces with peripheral apparatuses, an arithmetic operation apparatus, a register, and other components. Part or entirety of the functions of the processing apparatus 120 may be realized by hardware, such as a DSP (digital signal processor), an ASIC (application specific integrated circuit), a PLD (programmable logic device), and an FPGA (field programmable gate array). The processing apparatus 11 concurrently or successively perform a variety of processes.

The storage 12 is a recording medium readable by the processing apparatus 11 and stores a plurality of programs including a control program PR1 to be executed by the processing apparatus 11. The storage 12 further stores images projected in the multi-projection operation performed by the first projector 20 and the second projector 30. Furthermore, the storage 12 may store layout information on the arrangement of the first projector 20 and the second projector 30. The storage 12 may be formed, for example, of at least one of a ROM (read only memory), an EPROM (erasable programmable ROM), an EEPROM (electrically erasable programmable ROM), and a RAM (random access memory). The storage 12 may be called, for example, a register, a cache, a main memory, or a primary storage.

The display apparatus 13 is a device that displays images and text information. The display apparatus 13 displays a variety of images under the control of the processing apparatus 11. For example, any of a variety of display panels, such as a liquid crystal display panel and an organic electroluminescence (EL) display panel, is preferably used as the display apparatus 13.

The input apparatus 14 is an instrument that accepts a user's operation. For example, the input apparatus 14 includes a pointing device, such as a keyboard, a touchpad, a touch panel, or a mouse. The input apparatus 14 may include a touch panel and serve in this case also as the display apparatus 13.

The communication apparatus 15 is hardware as a transmission/reception device that communicates with other apparatuses, especially the first projector 20 and the second projector 30 and is, for example, an interface circuit and a wireless communication antenna. The communication apparatus 15 is also called, for example, a network device, a network controller, a network card, and a communication module.

The processing apparatus 11 functions as a first image generator 111, a second image generator 112, a first attenuation coefficient generator 113, a second attenuation coefficient generator 114, and an information output section 115 by reading the control program PR1 from the storage 12 and executing the control program PR1. The control program PR1 may be transmitted from another apparatus, such as a server that manages the processing apparatus 11, via a communication network NET.

The first image generator 111 generates a first projection image to be projected from the first projector 20 based on an overall image to be achieved by the multi-projection.

The second image generator 112 generates a second projection image to be projected from the second projector 30 based on the overall image to be achieved by the multi-projection.

Figure 3:
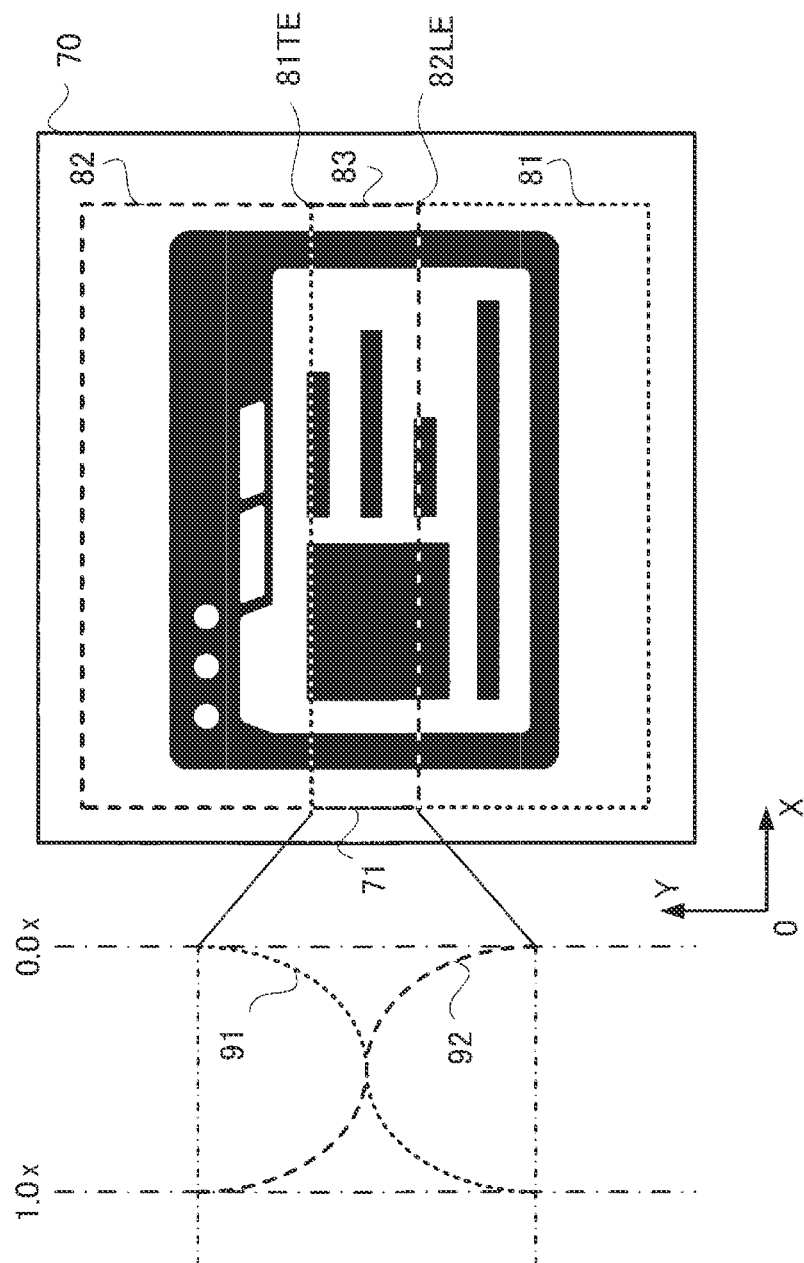
FIG. 3 shows an example of a first display image and a second display image.

FIG. 3 shows an example of a first display image 81 and a second display image 82 displayed on a display surface 70 when the first and second projection images are projected onto the display surface 70. In FIG. 3, the position of the upper end of the first display image 81 is labeled with "81TE". The position of the lower end of the second display image 82 is labeled with "82LE". In the present specification, the first display image 81 is referred simply to as a "first image 81" in some cases. Similarly, the second display image 82 is referred simply to as a "second image 82" in some cases.

In the example shown in FIG. 3, the first display image 81 and the second display image 82 are vertically arranged side by side, and when the positive direction of an axis Y shown in FIG. 3 is regarded as an upward direction, the second display image 82 is located above the first display image 81. The following description will be made by assuming that the positive direction of the axis Y shown in each figure is the upward direction. When the first display image 81 and the second display image 82 are used to display the entire image, it is conceivable to place the first display image 81 and the second display image 82 vertically adjacent to each other with no gap therebetween. It is, however, technically difficult to set the angle at which the first projection image is projected from the first projector 20 onto the display surface 70 and the angle at which the second projection image is projected from the second projector 30 onto the display surface 70 in such a way that the first display image 81 and the second display image 82 are adjacent to each other with no gap therebetween. In view of the difficulty described above, the angle at which the first projection image is projected and the angle at which the second projection image is projected are so set that an upper portion of the first display image 81 and a lower portion of the second display image 82 are superimposed on each other, as shown in FIG. 3. A combined image 83, which is a partial combination of the first display image 81 and the second display image 82, is thus displayed, in a superimposed area 71, where the first display image 81 and the second display image 82 are partially superimposed on each other. The combined image 83 is an image as a result of superimposition of the upper portion of the first display image 81 and the lower portion of the second display image 82, the two portions being formed of the same image, on each other with no shift therebetween. The projection system 1 can display the entire image by performing multi-projection in which the first display image 81 and the second display image 82 are partially superimposed on each other in the superimposed area 71 by using the combined image 83.

The processing apparatus 11 may calculate the position and size of the superimposed area 71 by using the layout information relating to the arrangement of the first projector 20 and the second projector 30 and stored in the storage 12. The processing apparatus 11 may instead determine the position and size of the superimposed area 71 based on input made by the user of the projection system 1 via the input apparatus 14.

Returning to the description with reference to FIG. 2, the first attenuation coefficient generator 113 generates a first attenuation coefficient that attenuates the brightness of the first display image 81 contained in the combined image 83 in the superimposed area 71 in accordance with the position in the superimposed area 71. Specifically, the first attenuation coefficient K1 is determined in accordance with the coordinate y on the axis Y shown in FIG. 3 and expressed as follows: $K1=f1(y)$. When the first display image 81 and the second display image 82 are partially superimposed on other along an axis X, K1 is expressed as follows: $K1=f1(x)$.

The second attenuation coefficient generator 114 generates a second attenuation coefficient that attenuates the brightness of the second display image 82 contained in the combined image 83 in the superimposed area 71 in accordance with the position in the superimposed area 71. The second attenuation coefficient K2 is determined in accordance with the coordinate y on the axis Y shown in FIG. 3 and expressed as follows: $K2=f2(y)$. When the first display image 81 and the second display image 82 are partially superimposed on other along the axis X, K2 is expressed as follows: $K2=f2(x)$.

When the upper portion of the first display image 81 and the lower portion of the second display image 82, the two portions being the same images, are simply superimposed on each other in the superimposed area 71 with no shift therebetween as described above, the combined image 83 is undesirably brighter than the first display image 81 and the second display image 82 displayed outside of the superimposed area 71. The difference in the brightness causes a visual discomfort in the overall image. To avoid the problem described above, the projection system 1 attenuates the brightness of the first display image 81 and the second display image 82 in the combined image 83 to suppress the visual discomfort in the overall image.

The left portion of FIG. 3 shows a gain curve 91 and a gain curve 92 as graphs of the first and second attenuation coefficients. The "first attenuation coefficient" used herein is the ratio of the brightness of the image corresponding to the superimposed area 71 out of the first display image 81 to the brightness of the image corresponding to the area excluding the superimposed area 71 out of the first display image 81. Similarly, the "second attenuation coefficient" is the ratio of the brightness of the image corresponding to the superimposed area 71 out of the second display image 82 to the brightness of the image corresponding to the area excluding the superimposed area 71 out of the second display image 82.

The gain of the first display image 81 is 0x at the upper end of the superimposed area 71, that is, at the position 81TE of the upper end of the first display image 81, as indicated by the gain curve 91. On the other hand, the gain of the first display image 81 is 1.0x at the lower end of the superimposed area 71, that is, at the position 82LE of the lower end of the second display image 82. The gain curve 91 has the shape of an inverted S letter extending from the upper end of the superimposed area 71 to the lower end of the superimposed area 71. On the other hand, the gain of the second display image 82 is 1.0x at the upper end of the superimposed area 71, that is, at the position 81TE of the upper end of the first display image 81. On the other hand, the gain of the second display image 82 is 0x at the lower end of the superimposed area 71, that is, at the position 82LE of the lower end of the second display image 82. The gain curve 92 has the shape of an S letter extending from the upper end of the superimposed area 71 to the lower end of the superimposed area 71.

The sum of the gain of the first display image 81 and the gain of the second display image 82 is therefore a constant value of one at any position in the superimposed area 71. As a result, uneven brightness in the superimposed area 71 and in turn the visual discomfort in the overall image is suppressed.

The first attenuation coefficient generator 113 may generate the first attenuation coefficient in accordance with input made by the user of the projection system 1 via the input apparatus 14. Similarly, the second attenuation coefficient generator 114 may generate the second attenuation coefficient in accordance with input made by the user of the projection system 1 via the input apparatus 14. Instead, the first attenuation coefficient generator 113 may generate the first attenuation coefficient based on a captured image of the display surface 70 captured by an imaging apparatus that is not shown but is provided in the control apparatus 10. Similarly, the second attenuation coefficient generator 114 may generate the second attenuation coefficient based on a captured image of the display surface 70 captured by the imaging apparatus, which is not shown but is provided in the control apparatus 10.

Returning to the description with reference to FIG. 2, the information output section 115 outputs the first display image 81 and the first attenuation coefficient to the first projector 20 via the communication apparatus 15. Similarly, the information output section 115 outputs the second display image 82 and the second attenuation coefficient to the second projector 30 via the communication apparatus 15. The information output section 115 may output the layout information stored in the storage 12 to the first projector 20 and the second projector 30 via the communication apparatus 15.

1-3. Configuration of First Projector 20

Figure 4:
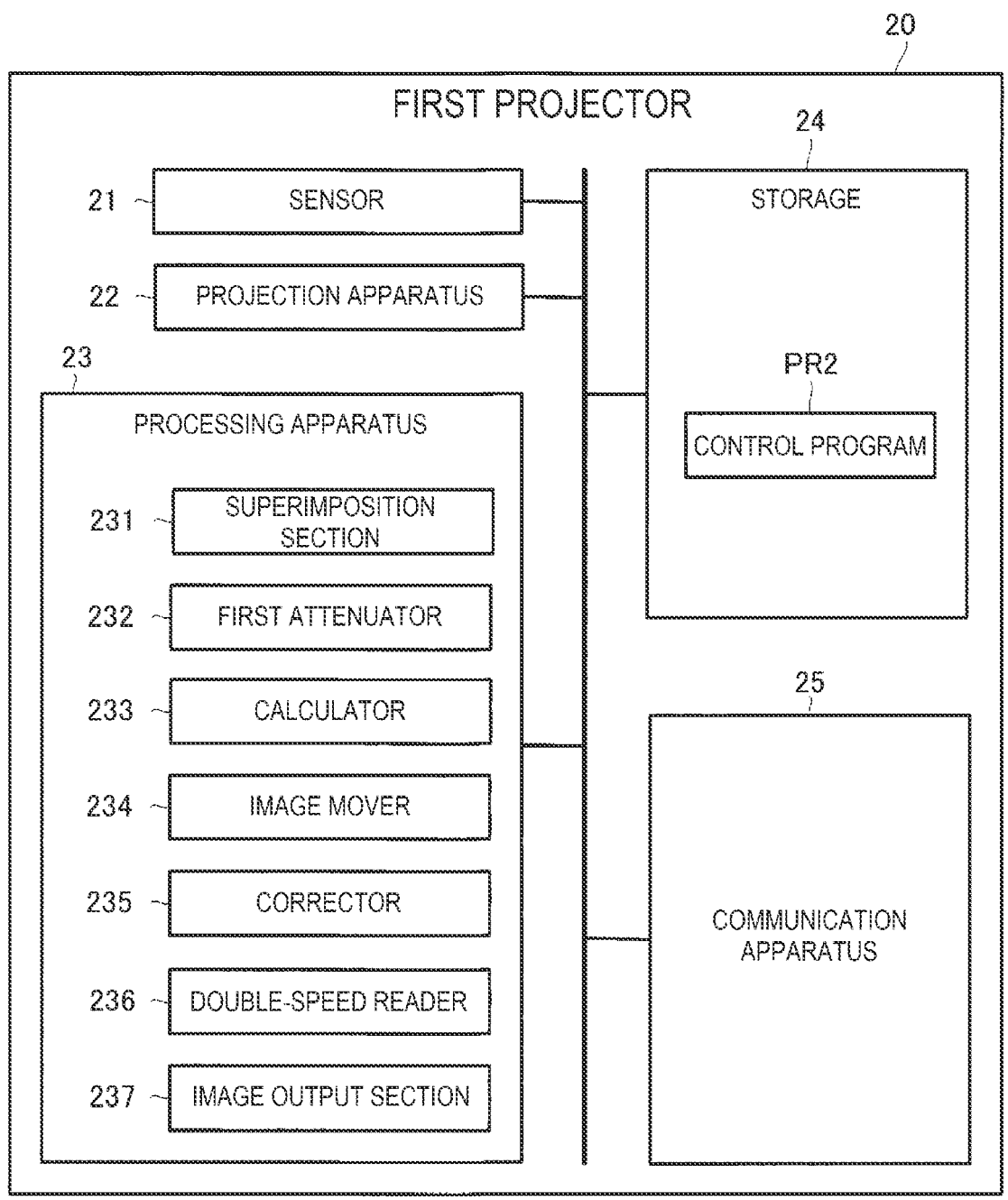
FIG. 4 is a block diagram showing an example of the configuration of a first projector.

FIG. 4 is a block diagram showing an example of the configuration of the first projector 20. The first projector 20 includes a sensor 21, a projection apparatus 22, a processing apparatus 23, a storage 24, and a communication apparatus 25. The elements of the first projector 20 are connected to each other via a single bus or a plurality of buses for information communication.

The sensor 21 is an inertial sensor that senses vibration of the first projector 20. The sensor 21 may, for example, be an acceleration sensor, a gyro sensor, or a sensor including an acceleration sensor and a gyro sensor. The sensor 21 is accommodated in an enclosure that is not shown but is part of the first projector 20, is fixed to the first projector 20, and can therefore sense the vibration of the first projector 20.

The projection apparatus 22 is an apparatus that projects the first projection image outputted from a first attenuator 232, which will be described later, onto a screen, a wall, or any other surface. The screen or the wall is an example of the display surface 70. The projection apparatus 22 projects a variety of images under the control of the processing apparatus 23. The projection apparatus 22 includes, for example, a light source, a liquid crystal panel, and a projection lens, modulates the light from the light source with the aid of the liquid crystal panel, and projects the modulated light onto the screen, the wall, or any other surface via the projection lens.

The processing apparatus 23 is a processor that controls the entire first projector 20 and is formed, for example, of a single chip or a plurality of chips. The processing apparatus 23 is formed, for example, of a central processing unit (CPU) including interfaces with peripheral apparatuses, an arithmetic operation apparatus, a register, and other components. Part or entirety of the functions of the processing apparatus 23 may be achieved by hardware, such as a DSP, an ASIC, a PLD, and an FPGA. The processing apparatus 23 concurrently or successively perform a variety of processes.

The storage 24 is a recording medium readable by the processing apparatus 23 and stores a plurality of programs including a control program PR2 to be executed by the processing apparatus 23. The storage 24 further stores the first projection image and the first attenuation coefficient, which are acquired via the communication apparatus 25, which will be described later. The storage 24 may still further store the layout information on the arrangement of the first projector 20 and the second projector 30. The storage 24 may be formed, for example, of at least one of a ROM, an EPROM, an EEPROM, and a RAM. The storage 24 may be called, for example, a register, a cache, a main memory, or a primary storage.

The communication apparatus 25 is hardware as a transmission/reception device that communicates with other apparatuses, especially the control apparatus 10, and is formed, for example, of an interface circuit and a wireless communication antenna. The communication apparatus 25 is also called, for example, a network device, a network controller, a network card, and a communication module.

The processing apparatus 23 functions as a superimposition section 231, the first attenuator 232, a calculator 233, an image mover 234, a corrector 235, a double-speed reader 236, and an image output section 237 by reading the control program PR2 from the storage 24 and executing the control program PR2. The control program PR2 may be transmitted from another apparatus, such as the server that manages the processing apparatus 23, via the communication network NET.

The superimposition section 231 first reads the first projection image from the storage 24. Furthermore, the superimposition section 231 superimposes a superimposition image on the first projection image. The superimposition image is an OSD (On Screen Display) superimposition image.

The first attenuator 232 first reads the first attenuation coefficient from the storage 24. The first attenuator 232 in some cases attenuates the brightness of an image out of the first projection image on which the superimposition image has been superimposed, the image at the location corresponding to the superimposed region 71 in the first display image 81, by using the first attenuation coefficient in accordance with the position in the superimposed region 71. Finally, the first attenuator 232 stores in the storage 24 the first projection image in which the brightness of the image at the location corresponding to the superimposed area 71 is attenuated.

The calculator 233 calculates displacement information on the position of the first projector 20 based on an output signal from the sensor 21. The "displacement information" contains the amount of displacement representing the magnitude of displacement of the first projector 20 and a direction of displacement representing the direction of the displacement of the first projector 20.

For example, when the sensor 21 is an acceleration sensor, it is assumed that the first projector 20 is installed in a three-dimensional space expressed by x, y, and z. The calculator 233 can calculate the amount of displacement by which the position of the first projector 20 is displaced by integrating twice with time the values of acceleration in the axes x, y, and z detected by the sensor 21. Instead, when the sensor 21 is a gyro sensor, it is assumed that the posture of the first projector 20 is defined by orthogonal axes, roll, pitch, and yaw axes. The calculator 233 can calculate the amount of displacement by which the posture of the first projector 20 is displaced by integrating once with time the values of angular velocity around the roll, pitch, and yaw axes detected by the sensor 21.

When the position of the first projector 20 is displaced from a reference position, the image mover 234 moves the first projection image in the liquid crystal panel in such a way that the first display image 81 moves on the display surface 70 in the direction opposite to the direction of displacement in accordance with the amount of displacement. The "reference position" refers to the position of the first projector 20 in a case where the first projector 20 is not vibrating.

When the first projector 20 vibrates while displaying the first display image 81 on the display surface 70 by projecting the first projection image onto the display surface 70, the first display image 81 also vibrates in accordance with the vibration of the first projector 20. As a result, the first display image 81 and the second display image 82 shift from each other on the display surface 70. Causing the first display image 81 and the second display image 82 to be displayed in the multi-projection therefore results in a visual discomfort in the overall image displayed on the display surface 70.

To eliminate the discomfort described above, the image mover 234 calculates the amount of shift of the first display image 81 by using the distance between the first projector 20 and the display surface 70, the positional relationship between the optical axis of the first projector 20 and the display surface 70, and other factors in addition to the calculated amount of displacement of the first projector 20. Furthermore, the image mover 234 moves the first projection image in the liquid crystal panel in such a way that the first display image 81 is moved by the amount of shift in the direction opposite to the direction of displacement of the first projector 20. In other words, the image mover 234 moves the first projection image in the liquid crystal panel by the amount of shift in such a way that the first projection image approaches the position where the first displayed image 81 is displayed when the first projector 20 does not vibrate.

Figure 5:
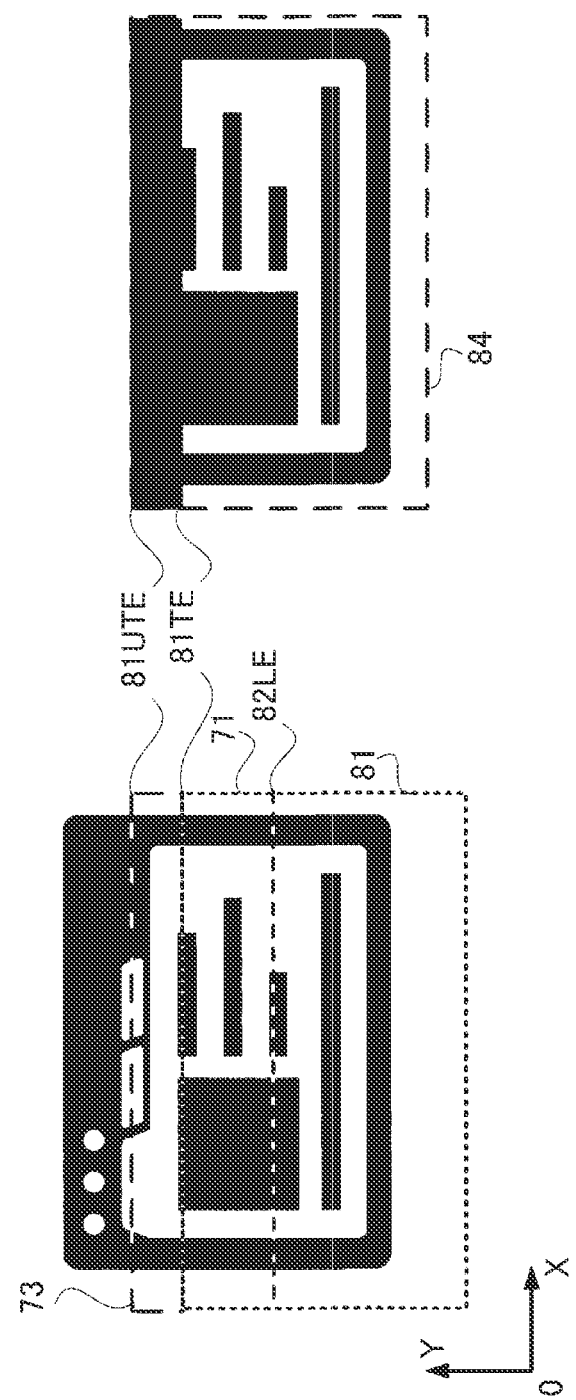
FIG. 5 describes how a corrector corrects a first attenuation coefficient.
Figure 6:
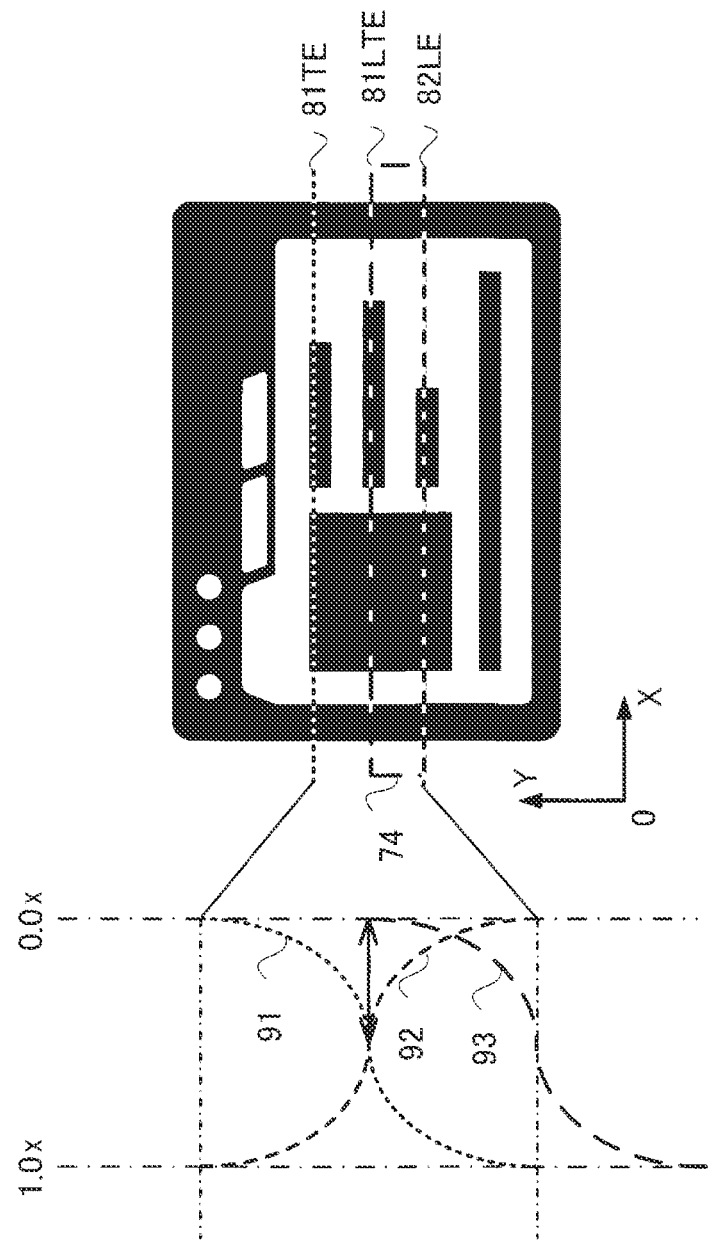
FIG. 6 describes how the corrector corrects the first attenuation coefficient.
Figure 7:
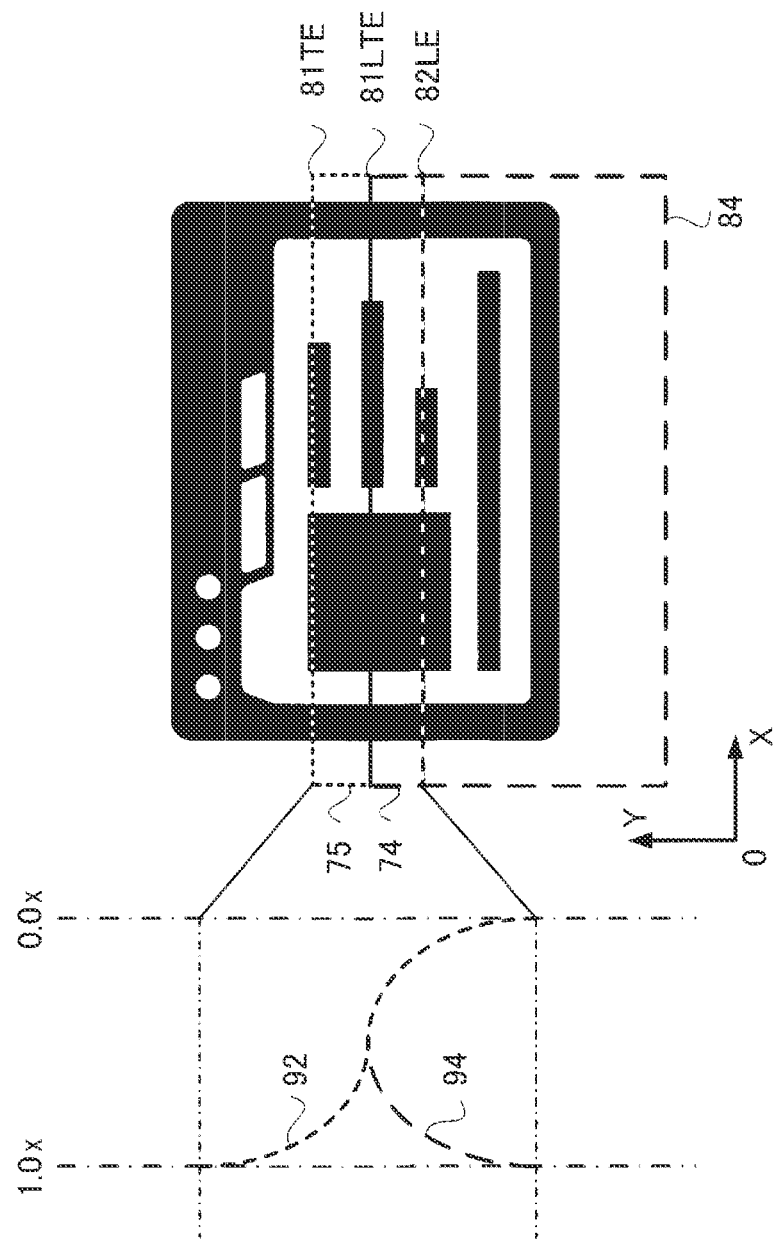
FIG. 7 describes how the corrector corrects the first attenuation coefficient.

The corrector 235 corrects the first attenuation coefficient in accordance with the displacement information. FIGS. 5 to 7 describe how the corrector 235 corrects the first attenuation coefficient.

In FIG. 5, the upper end of the first display image 81 having swung upward is labeled with "81UTE". The original position of the upper end of the first display image 81 is labeled with "81TE". The lower end of the second display image 82 is labeled with "82LE". When the first display image 81 swings upward on the display surface 70 due to the vibration of the first projector 20, the image mover 234 moves the first projection image in the liquid crystal panel in such a way that the first display image 81 is shifted downward. As a result, the moved first display image 84 is displayed at substantially the same position as the position of the original first display image 81, as shown in the right portion of FIG. 5. The area over which the first projector 20 performs projection, however, remains in the position having swung upward, so that the upper end of the first display image 84 coincides with the position of the upper end 81UTE of the projection area having swung upward, as shown in FIG. 5. As a result, a newly superimposed area 73, where the first display image 81 and the second display image 82 are partially superimposed on each other, is added to the original superimposed area 71. In this newly superimposed area 73, the first display image 81 is newly partially superimposed on the second display image 82, so that the superimposed area 73 is undesirably brighter than the superimposed area 71. To avoid the situation described above, the corrector 235 sets the gain of a portion of the first display image 81, the portion corresponding to the superimposed area 73, at 0x and fills the portion with black, as shown in the right portion of FIG. 5. The sum of the gain of the first display image 81 and the gain of the second display image 82 in the superimposed area 73 is therefore 1.0x at any location in the superimposed area 73.

In FIG. 6, the original position of the upper end of the first display image 81 is labeled with "81TE". The upper end of the first display image 81 having swung downward is labeled with "81LTE". The lower end of the second display image 82 is labeled with "82LE". In FIG. 7, the original position of the upper end of the first display image 81 is labeled with "81TE". The upper end of the first display image 81 having swung downward is labeled with "81LTE". The lower end of the second display image 82 is labeled with "82LE". When the first display image 81 swings downward on the display surface 70 due to the vibration of the first projector 20, the image mover 234 moves the first projection image in the liquid crystal panel in such a way that the first display image 81 is shifted upward on the display surface 70. As the first display image 81 swings downward, however, the gain curve 91 also shifts downward, that is, in the negative direction of the axis Y, as shown in the form of a gain curve 93 in FIG. 6. As a result, the sum of the gain of the first display image 81 and the gain of the second display image 82 is not maintained at 1.0 in the newly superimposed area 74. To avoid the problem described above, the corrector 235 shifts a gain curve 94, which is part of the gain curve 93 and corresponds to the newly superimposed area 74, upward by the amount by which the gain curve 91 has shifted downward, as shown in FIG. 7. As a result, the sum of the gain of the first display image 81 and the gain of the second display image 82 is maintained at 1.0 in the newly superimposed area 74.

After the corrector 235 corrects the first attenuation coefficient, the first attenuator 232 uses the new attenuation coefficient to attenuate the brightness of an image out of the first projection image, the image at the location corresponding to the newly superimposed area 74 in the first display image 81, in accordance with the position in the newly superimposed area 74. The first attenuator 232 stores in the storage 24 the first projection image in which the brightness of the image at the location corresponding to the newly superimposed area 74 is attenuated.

The double-speed reader 236 reads the first projection image written to the storage 24 from the storage 24 at a speed higher than the write speed. The first projection image read by the double-speed reader 236 is outputted to the image output section 237.

The image output section 237 outputs the first projection image read by the double-speed reader 236 to the projection apparatus 22.

1-4. Configuration of Second Projector 30

Figure 8:
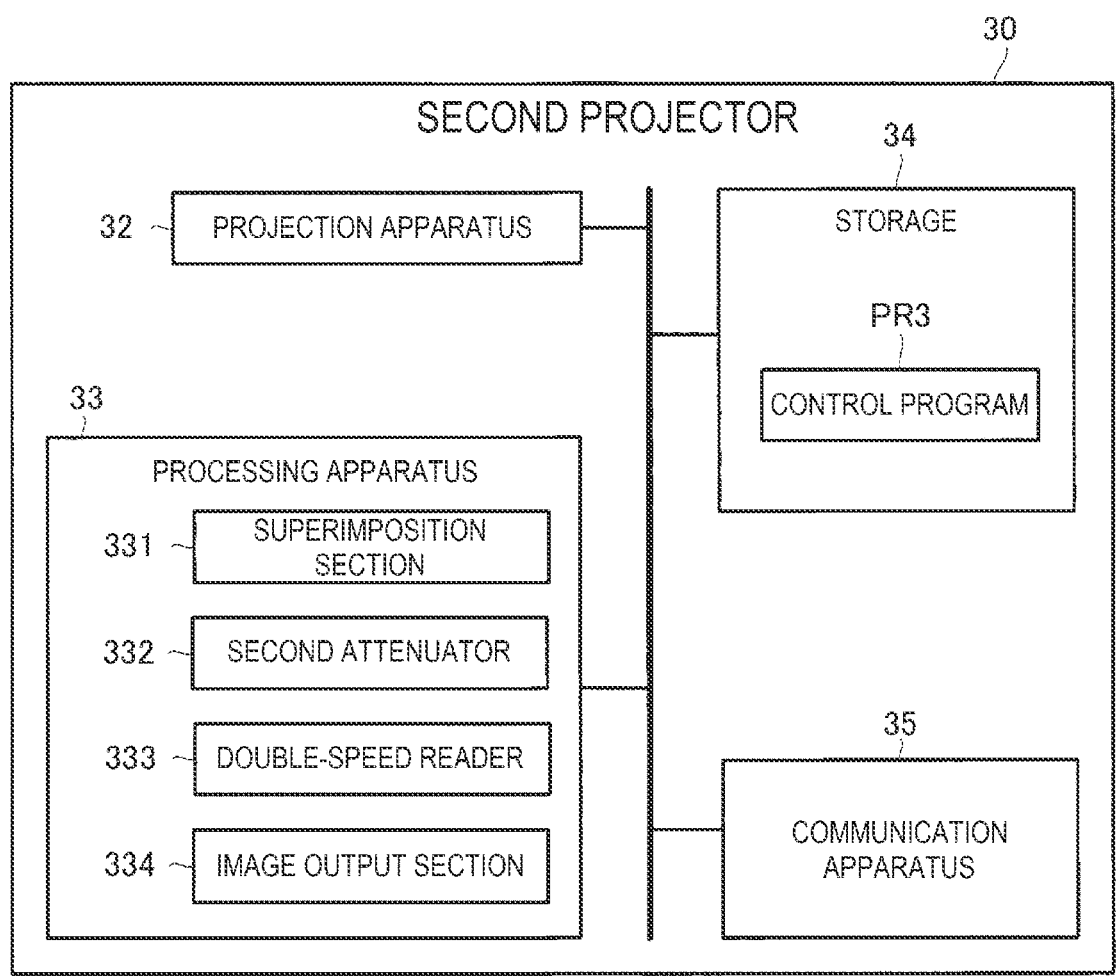
FIG. 8 is a block diagram showing an example of the configuration of a second projector.

FIG. 8 is a block diagram showing an example of the configuration of the second projector 30. The second projector 30 includes a projection apparatus 32, a processing apparatus 33, a storage 34, and a communication apparatus 35. The elements of the second projector 30 are connected to each other via a single bus or a plurality of buses for information communication.

The projection apparatus 32 is an apparatus that projects the second projection image outputted from an image output section 334, which will be described later, onto the screen, the wall, or any other surface. The screen or the wall is an example of the display surface 70. The projection apparatus 32 projects a variety of images under the control of the processing apparatus 33. The projection apparatus 32 includes, for example, a light source, a liquid crystal panel, and a projection lens, modulates the light from the light source with the aid of the liquid crystal panel, and projects the modulated light onto the screen, the wall, or any other surface via the projection lens.

The processing apparatus 33 is a processor that controls the entire second projector 30 and is formed, for example, of a single chip or a plurality of chips. The processing apparatus 33 is formed, for example, of a central processing unit (CPU) including interfaces with peripheral apparatuses, an arithmetic operation apparatus, a register, and other components. Part or entirety of the functions of the processing apparatus 33 may be achieved by hardware, such as a DSP, an ASIC, a PLD, and an FPGA. The processing apparatus 33 concurrently or successively perform a variety of processes.

The storage 34 is a recording medium readable by the processing apparatus 33 and stores a plurality of programs including a control program PR3 to be executed by the processing apparatus 33. The storage 34 further stores the second projection image and the second attenuation coefficient, which are acquired via the communication apparatus 35, which will be described later. The storage 34 may still further store the layout information on the arrangement of the first projector 20 and the second projector 30. The storage 34 may be formed, for example, of at least one of a ROM, an EPROM, an EEPROM, and a RAM. The storage 24 may be called, for example, a register, a cache, a main memory, or a primary storage.

The communication apparatus 35 is hardware as a transmission/reception device that communicates with other apparatuses, especially the control apparatus 10, and is formed, for example, of an interface circuit and a wireless communication antenna. The communication apparatus 35 is also called, for example, a network device, a network controller, a network card, and a communication module.

The processing apparatus 33 functions as a superimposition section 331, a second attenuator 332, a double-speed reader 333, and an image output section 334 by reading the control program PR3 from the storage 34 and executing the control program PR3. The control program PR3 may be transmitted from another apparatus, such as a server that manages the second projector 30, via the communication network NET.

The superimposition section 331 first reads the second projection image from the storage 34. Furthermore, the superimposition section 331 superimposes a superimposition image on the second projection image. The superimposition image is an OSD (On Screen Display) superimposition image.

The second attenuator 332 first reads the second attenuation coefficient from the storage 34. The second attenuator 332 in some cases attenuates the brightness of an image out of the second projection image on which the superimposition image has been superimposed, the image at the location corresponding to the superimposed region 71 in the second display image 82, by using the second attenuation coefficient in accordance with the position in the superimposed region 71. Finally, the second attenuator 332 outputs the second projection image in which the brightness of the image at the location corresponding to the superimposed area 71 is attenuated to the projection apparatus 32.

The double-speed reader 333 reads the second projection image written to the storage 34 from the storage 34 at a speed higher than the write speed. The second projection image read by the double-speed reader 333 is outputted to the image output section 334.

The image output section 334 outputs the second projection image read by the double-speed reader 333 to the projection apparatus 32.

1-5. Action in First Embodiment

Figure 9:
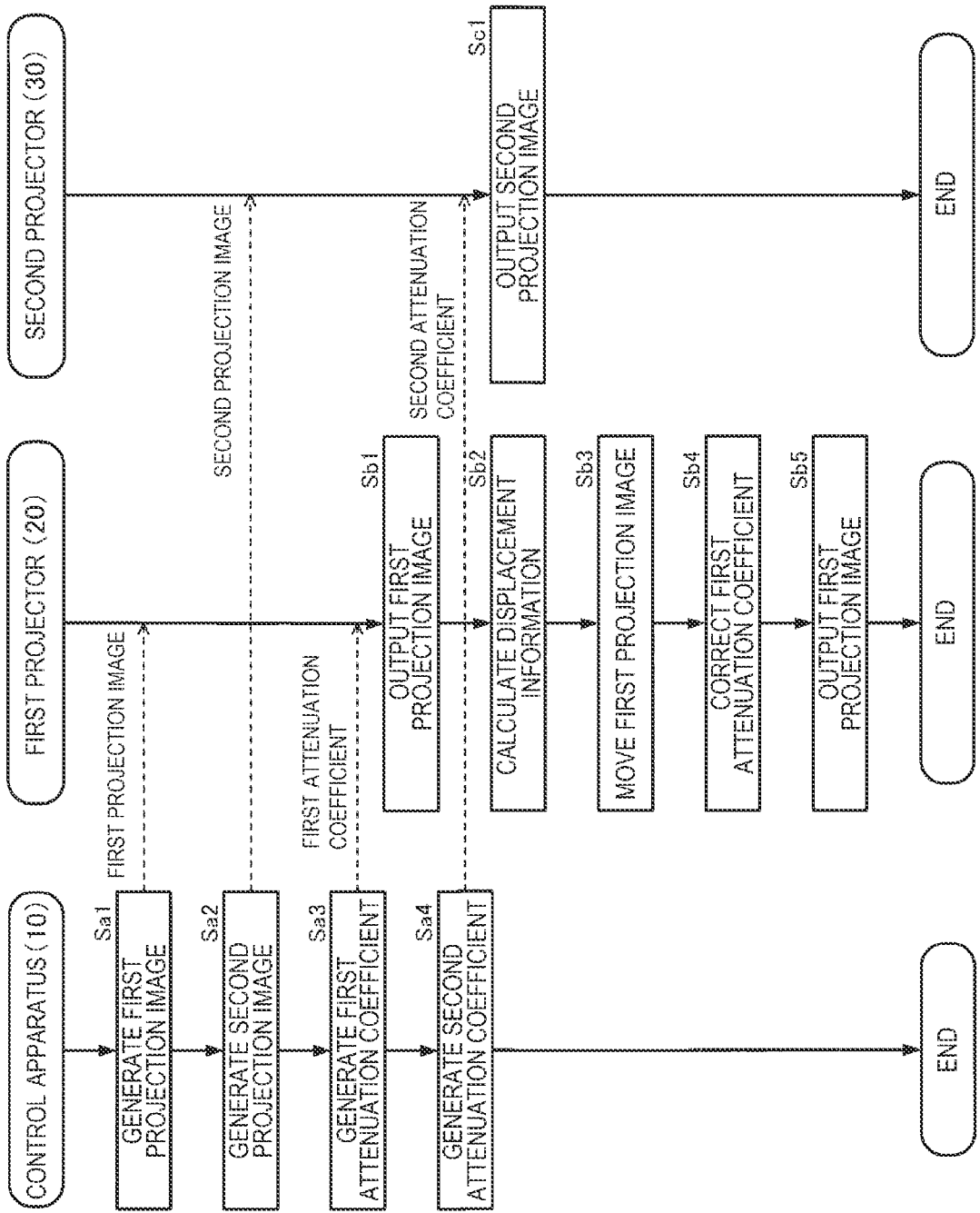
FIG. 9 is a sequence chart showing an example of the action of the projection system.

The action of the projection system 1 will next be described. FIG. 9 is a sequence chart showing an example of the action of the projection system 1.

In step Sa1, the processing apparatus 11 of the control apparatus 10 functions as the first image generator 111 to generate the first projection image. The processing apparatus 11 of the control apparatus 10 functions as the information output section 115 to output the generated first projection image to the first projector 20.

In step Sa2, the processing apparatus 11 of the control apparatus 10 functions as the second image generator 112 to generate the second projection image. The processing apparatus 11 of the control apparatus 10 functions as the information output section 115 to output the generated second projection image to the second projector 30.

In step Sa3, the processing apparatus 11 of the control apparatus 10 functions as the first attenuation coefficient generator 113 to generate the first attenuation coefficient. The processing apparatus 11 of the control apparatus 10 functions as the information output section 115 to output the generated first attenuation coefficient to the first projector 20.

In step Sb1, the processing apparatus 23 of the first projector 20 functions as the first attenuator 232 to attenuate the brightness of an image out of the first projection image, the image at the location corresponding to the superimposed region 71 in the first display image 81, by using the first attenuation coefficient in accordance with the position in the superimposed region 71. The processing apparatus 23 functions as the first attenuator 232 to store in the storage 24 the first projection image in which the brightness of the image at the location corresponding to the superimposed area 71 is attenuated. The processing apparatus 23 functions as the double-speed reader 236 to read the first projection image written to the storage 24 from the storage 24 at a speed higher than the write speed. Furthermore, the processing apparatus 23 functions as the image output section 237 to output the first projection image read by the double-speed reader 236 to the projection apparatus 22. As a result, the first display image 81 is displayed on the display surface 70.

In step Sa4, the processing apparatus 11 of the control apparatus 10 functions as the second attenuation coefficient generator 114 to generate the second attenuation coefficient. The processing apparatus 11 of the control apparatus 10 functions as the information output section 115 to output the generated second attenuation coefficient to the second projector 30.

In step Sc1, the processing apparatus 33 of the second projector 30 functions as the second attenuator 332 to attenuate the brightness of an image out of the second projection image, the image at the location corresponding to the superimposed region 71 in the second display image 82, by using the second attenuation coefficient in accordance with the position in the superimposed region 71. The processing apparatus 33 functions as the second attenuator 332 to store in the storage 34 the second projection image in which the brightness of the image at the location corresponding to the superimposed area 71 is attenuated. The processing apparatus 33 functions as the double-speed reader 333 to read the second projection image written to the storage 34 from the storage 34 at a speed higher than the write speed. Furthermore, the processing apparatus 33 functions as the image output section 334 to output the second projection image read by the double-speed reader 333 to the projection apparatus 32. As a result, the second display image 82 is displayed on the display surface 70.

In step Sb2, the processing apparatus 23 of the first projector 20 functions as the calculator 233 to calculate the displacement information on the position of the first projector 20 based on the output signal from the sensor 21.

In step Sb3, the processing apparatus 23 of the first projector 20 functions as the image mover 234 to move the first projection image in the liquid crystal panel when the position of the first projector 20 is displaced from the reference position. As a result, the first display image 81 moves on the display surface 70 in the direction opposite to the direction of displacement in accordance with the amount of displacement.

In step Sb4, the processing apparatus 23 of the first projector 20 functions as the corrector 235 to correct the first attenuation coefficient in accordance with the displacement information.

In step Sb5, the processing apparatus 23 of the first projector 20 functions as the first attenuator 232 to attenuate the brightness of an image out of the first projection image, the image at the location corresponding to the newly superimposed region in the first display image 81, by using the corrected first attenuation coefficient in accordance with the position in the newly superimposed region. The processing apparatus 23 functions as the first attenuator 232 to store in the storage 24 the first projection image in which the brightness of the image at the location corresponding to the newly superimposed area is attenuated. The processing apparatus 23 functions as the double-speed reader 236 to read the first projection image written to the storage 24 from the storage 24 at a speed higher than the write speed. Furthermore, the processing apparatus 23 functions as the image output section 237 to output the first projection image read by the double-speed reader 236 to the projection apparatus 22. As a result, the new first display image 84 is displayed on the display surface 70.

1-6. Effects Provided by First Embodiment

In the image displaying method according to the present embodiment, when the position of the first projector 20 is the reference position, the first attenuator 232 attenuates the brightness of an image out of the first display image 81, the image corresponding to the superimposed area 71, where the first display image 81 and the second display image 82 displayed by the second projector 30 are partially superimposed on each other on the display surface 70, based on the first attenuation coefficient specified in accordance with the position in the superimposed area 71. Thereafter, when the position of the first projector 20 is displaced from the reference position, the corrector 235 corrects the first attenuation coefficient in accordance with the displacement information on the displacement of the first projector 20 calculated based on the output signal from the sensor 21. Finally, when the position of the first projector 20 is displaced from the reference position, the first attenuator 232 attenuates the brightness of the image corresponding to the superimposed area 71, 73, or 74 out of the first display image 81 based on the corrected first attenuation coefficient.

The configuration described above can suppress deterioration of the display quality of the display image in the superimposed area 71, 73, or 74 and suppress unnatural appearance therein even when the first projector 20 vibrates. In particular, the use of the first attenuation coefficient corrected in accordance with the vibration allows suppression of uneven brightness that occurs in the superimposed area 71, 73, or 74.

The displacement information contains the amount of displacement representing the magnitude of displacement of the first projector 20 and the direction of displacement representing the direction of the displacement of the first projector 20. When the position of the first projector 20 is displaced from the reference position, the image mover 234 moves the first display image 81 in the direction opposite to the direction of displacement in accordance with the amount of displacement.

The configuration described above allows correction of swing of the first display image 81 caused by vibration of the main body of the first projector 20.

The "first attenuation coefficient" is the ratio of the brightness of the image corresponding to the superimposed area 71 out of the first display image 81 to the brightness of the image corresponding to the area excluding the superimposed area 71 out of the first display image 81. The second attenuation coefficient is the ratio of the brightness of the image corresponding to the superimposed area 71 out of the second display image 82 to the brightness of the image corresponding to the area excluding the superimposed area 71 out of the second display image 82. The sum of the first and second attenuation coefficients is one.

Maintaining the sum of the first and second attenuation coefficients in the superimposed area 71 at one suppresses uneven brightness of the image in the superimposed area 71.

In the first projector 20 according to the present embodiment, when the position of the first projector 20 is the reference position, the first attenuator 232 attenuates the brightness of an image out of the first display image 81, the image corresponding to the superimposed area 71, where the first display image 81 and the second display image 82 displayed by the second projector 30 are partially superimposed on each other on the display surface 70, based on the first attenuation coefficient specified in accordance with the position in the superimposed area 71. Thereafter, when the position of the first projector 20 is displaced from the reference position, the corrector 235 corrects the first attenuation coefficient in accordance with the displacement information on the displacement of the first projector 20 calculated based on the output signal from the sensor 21. Finally, when the position of the first projector 20 is displaced from the reference position, the first attenuator 232 attenuates the brightness of the image corresponding to the superimposed area 71, 73, or 74 out of the first display image 81 based on the corrected first attenuation coefficient.

The configuration described above can suppress deterioration of the display quality of the display image in the superimposed area 71, 73, or 74 and suppress unnatural appearance therein even when the first projector 20 vibrates. In particular, the use of the first attenuation coefficient corrected in accordance with the vibration allows suppression of uneven brightness that occurs in the superimposed area 71, 73, or 74.

The projection system 1 according to the present embodiment includes the first projector 20, which displays the first display image 81 on the display surface 70, and the second projector 30, which displays the second display image 82 on the display surface 70. In the first projector 20, when the position of the first projector 20 is the reference position, the first attenuator 232 attenuates the brightness of an image out of the first display image 81, the image corresponding to the superimposed area 71, where the first display image 81 and the second display image 82 are partially superimposed on each other on the display surface 70, based on the first attenuation coefficient specified in accordance with the position in the superimposed area 71. Thereafter, when the position of the first projector 20 is displaced from the reference position, the corrector 235 corrects the first attenuation coefficient in accordance with the displacement information on the displacement of the first projector 20 calculated based on the output signal from the sensor 21. Finally, when the position of the first projector 20 is displaced from the reference position, the first attenuator 232 attenuates the brightness of the image corresponding to the superimposed area 71, 73, or 74 out of the first display image 81 based on the corrected first attenuation coefficient.

The configuration described above can suppress deterioration of the display quality of the display image in the superimposed area 71, 73, or 74 and suppress unnatural appearance therein even when the first projector 20 vibrates. In particular, the use of the first attenuation coefficient corrected in accordance with the vibration allows suppression of uneven brightness that occurs in the superimposed area 71, 73, or 74.

2. Second Embodiment 2-1. Overall Configuration

Figure 10:
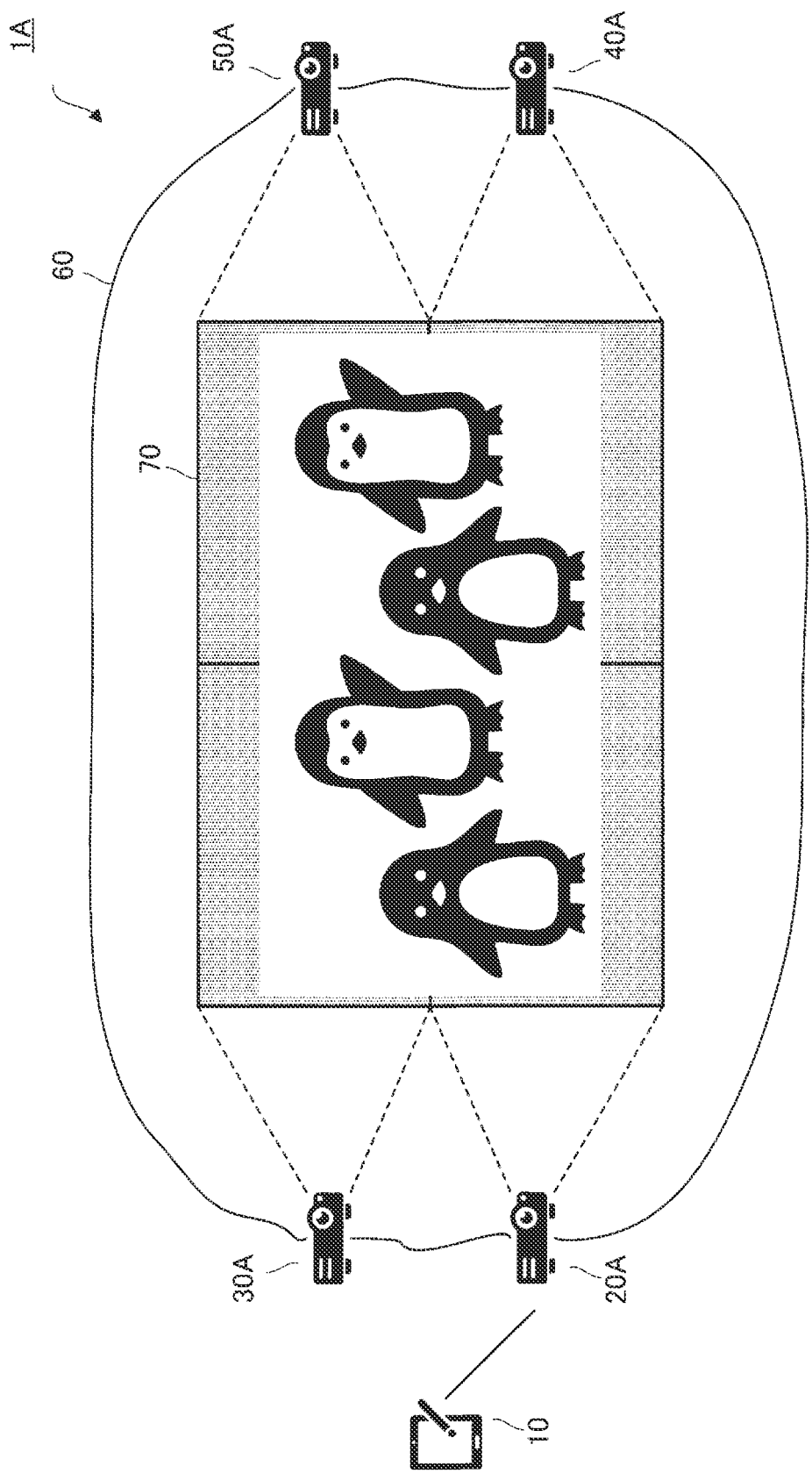
FIG. 10 is a schematic view showing an overall configuration of the projection system according to a second embodiment.

FIG. 10 is a schematic view showing an overall configuration of a projection system 1A according to a second embodiment. The projection system 1A includes the single control apparatus 10 and a plurality of projectors, a first projector 20A, a second projector 30A, a third projector 40A, and a fourth projector 50A. In the example shown in FIG. 10, the projection system 1A includes four projectors, the first projector 20A, the second projector 30A, the third projector 40A, and the fourth projector 50A for simplification of the description. The number of projectors provided in the projection system 1A is, however, not limited to four and may be two, three, or five or more.

The first projector 20A to the fourth projector 50A are communicably connected to each other via a connection cable 60, as shown in FIG. 10. In the configuration in which the first projector 20A to the fourth projector 50A are communicably connected to each other, the first projector 20A transmits position information on the position of the superimposed areas to the other projectors, as will be described later. The "position information" used herein is information on the two-dimensional position of the superimposed area 71 on the display surface 70. The position information is expressed, for example, by (x, y) coordinates in the XY coordinate system shown in FIG. 3.

In the example shown in FIG. 10, the connection cable 60 connects the first projector 20A to the fourth projector 50A to each other in the form of a daisy chain, that is, are tied in a row so as to form a loop. How to connect the first projector 20A to the fourth projector 50A according to the present embodiment to each other is, however, not limited to a daisy chain. Any connection method can be employed as long as the connection method allows the first projector 20A to transmit the position information on the position of the superimposed areas to the other projectors.

2-2. Configuration of First Projector 20A

Figure 11:
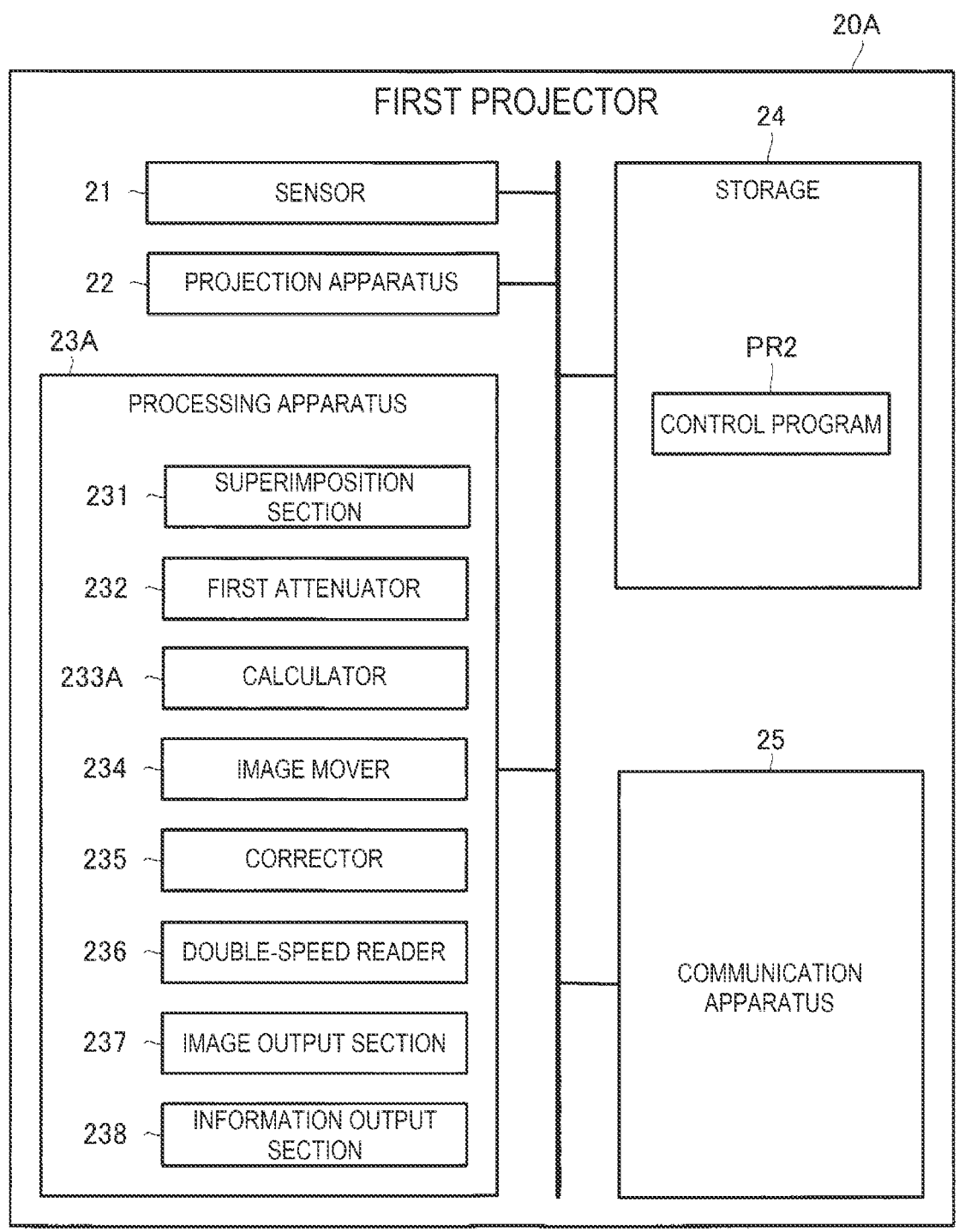
FIG. 11 is a block diagram showing an example of the configuration of the first projector.

FIG. 11 is a block diagram showing an example of the configuration of the first projector 20A. Out of the components provided in the first projector 20A according to the present embodiment, the same components as those provided in the first projector 20 according to the first embodiment have the same reference characters, and the functions of the same components will not be described for simplicity of the description. In the following description, differences between the first projector 20A and the first projector 20 will be primarily described.

The first projector 20A differs from the first projector 20 and includes a processing apparatus 23A in place of the processing apparatus 23. The processing apparatus 23A includes a calculator 233A in place of the calculator 233. In addition to the components provided in the processing apparatus 23, the processing apparatus 23A includes an information output section 238.

The calculator 233A calculates the displacement information on the position of the first projector 20A based on the output signal from the sensor 21. The calculator 233A calculates the position information on the position of the superimposed area 71 on the display surface 70 by using the calculated displacement information, the layout information stored in the storage 24, and other pieces of information.

The information output section 238 outputs the position information calculated by the calculator 233A to the second projector 30A to the fourth projector 50A via the communication apparatus 25.

2-3. Configuration of Second Projector 30A

Figure 12:
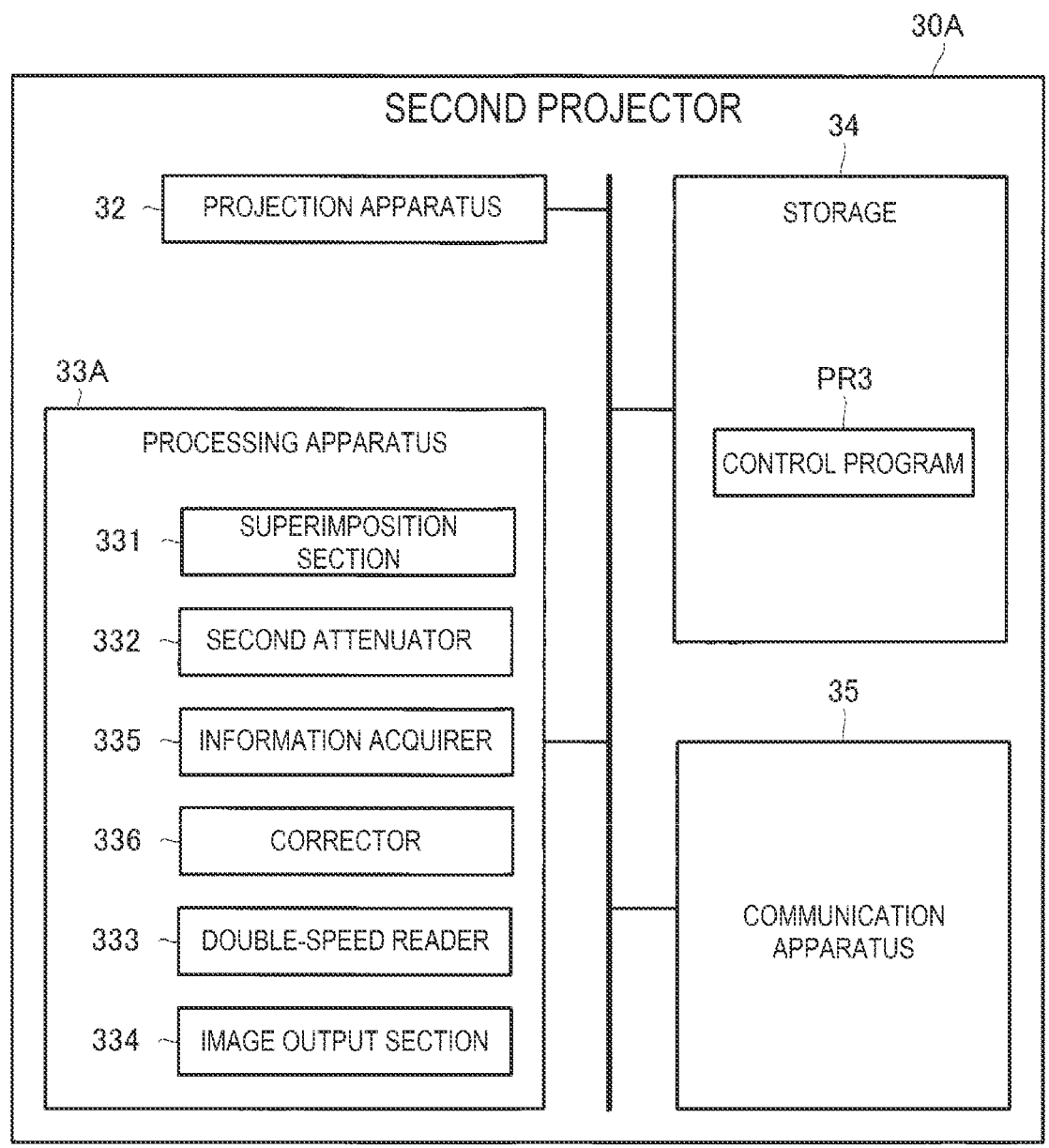
FIG. 12 is a block diagram showing an example of the configuration of the second projector.

FIG. 12 is a block diagram showing an example of the configuration of the second projector 30A. Out of the components provided in the second projector 30A according to the present embodiment, the same components as those provided in the second projector 30 according the first embodiment have the same reference characters, and the functions of the same components will not be described for simplicity of the description. In the following description, differences between the second projector 30A and the second projector 30 will be primarily described. The configurations of the third projector 40A and the fourth projector 50A are the same as the configuration of the second projector 30A shown in FIG. 12 and will therefore be not illustrated or described.

The second projector 30A differs from the second projector 30 and includes a processing apparatus 33A in place of the processing apparatus 33. In addition to the components provided in processing apparatus 33, the processing apparatus 33A includes an information acquirer 335 and a corrector 336.

The information acquirer 335 acquires the position information from the first projector 20A via the communication apparatus 35.

Figure 13:
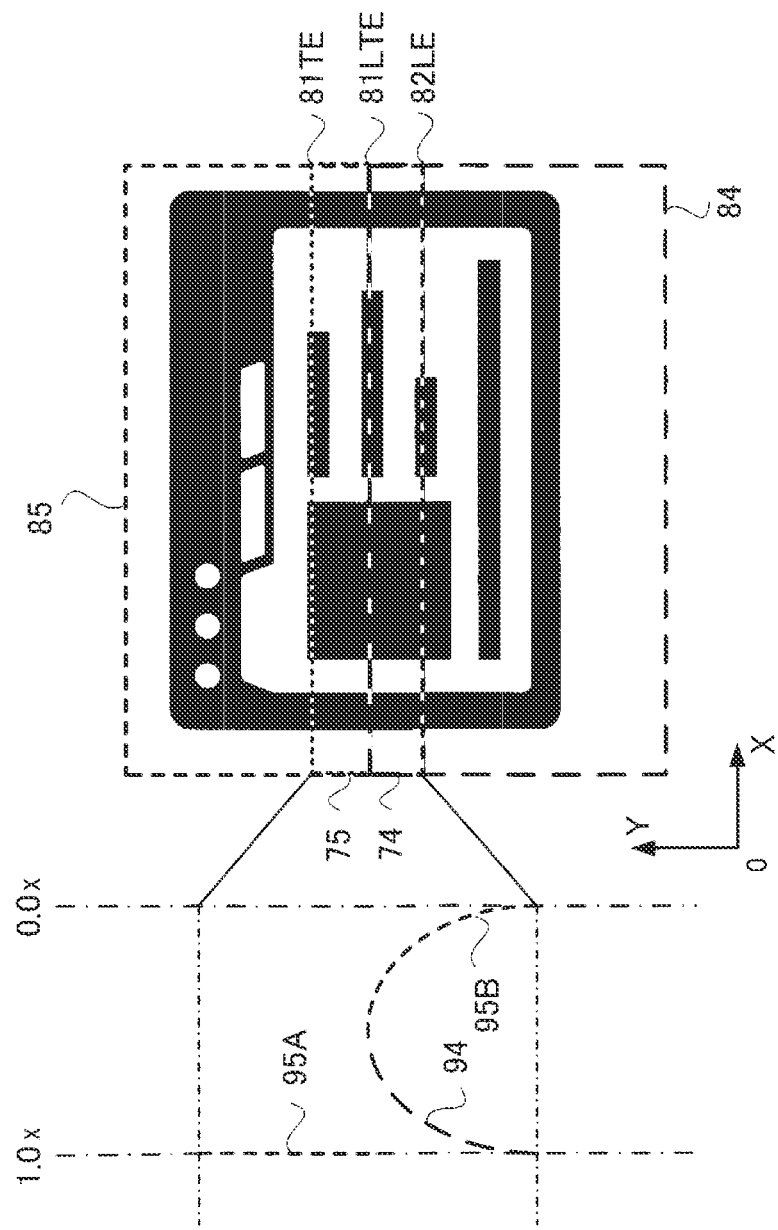
FIG. 13 describes how the corrector corrects a second attenuation coefficient.

The corrector 336 corrects the second attenuation coefficient by using the position information acquired by the information acquirer 335. FIG. 13 describes how the corrector 336 corrects the second attenuation coefficient. In FIG. 13, the original position of the upper end of the first display image 81 is labeled with "81TE". The upper end of the first display image 81 having swung downward is labeled with "81LTE". The lower end of the second display image 82 is labeled with "82LE".

Referring now to FIG. 7, in the projection system 1 according to the first embodiment, when the first display image 81 swings downward, the corrector 235 corrects the first attenuation coefficient but does not correct the second attenuation coefficient. The gain of the second display image 82 is therefore expressed by the curve having values from 1.0x to 0.5x in an area 75, which has an upper end located at the original position 81TE of the upper end of the first display image 81 and a lower end located at the position of the upper end 81LTE of the first display image 81 having swung downward, as shown in FIG. 7. When the first display image 81 swings downward, the first display image 81 is not present in the area 75 but only the second display image 82 in which the gain changes from 1.0x to 0.5x is present in the area 75. The brightness of the area 75 is therefore undesirably lower than the brightness of the other areas. To eliminate the problem described above, the corrector 336 cancels the edge blending in the area 75 by correcting the second attenuation coefficient, as shown in FIG. 13. A gain curve 95 representing the corrected second attenuation coefficient forms a straight line segment 95A, which does not change but represents a fixed gain of 1.0 in the area 75. On the other hand, the gain curve 95 forms a curved segment 95B representing the gain changing from 0.5x to 0x in the superimposed area 74 having an upper end located at the position of the upper end 81LTE of the first display image 81 having swung downward and a lower end located at the position of the lower end 82LE of the second display image 82. The sum of the gain of the first display image 81 and the gain of the second display image 82 are therefore maintained at 1.0 in all the areas where the first display image 81 and the second display image 82 are displayed. The numerical value of "0.5x" in the above description is an example of the numerical value of the gain, but not limited thereto, and only needs to be a numerical value between 0x and 1x.

2-4. Action in Second Embodiment

Figure 14:
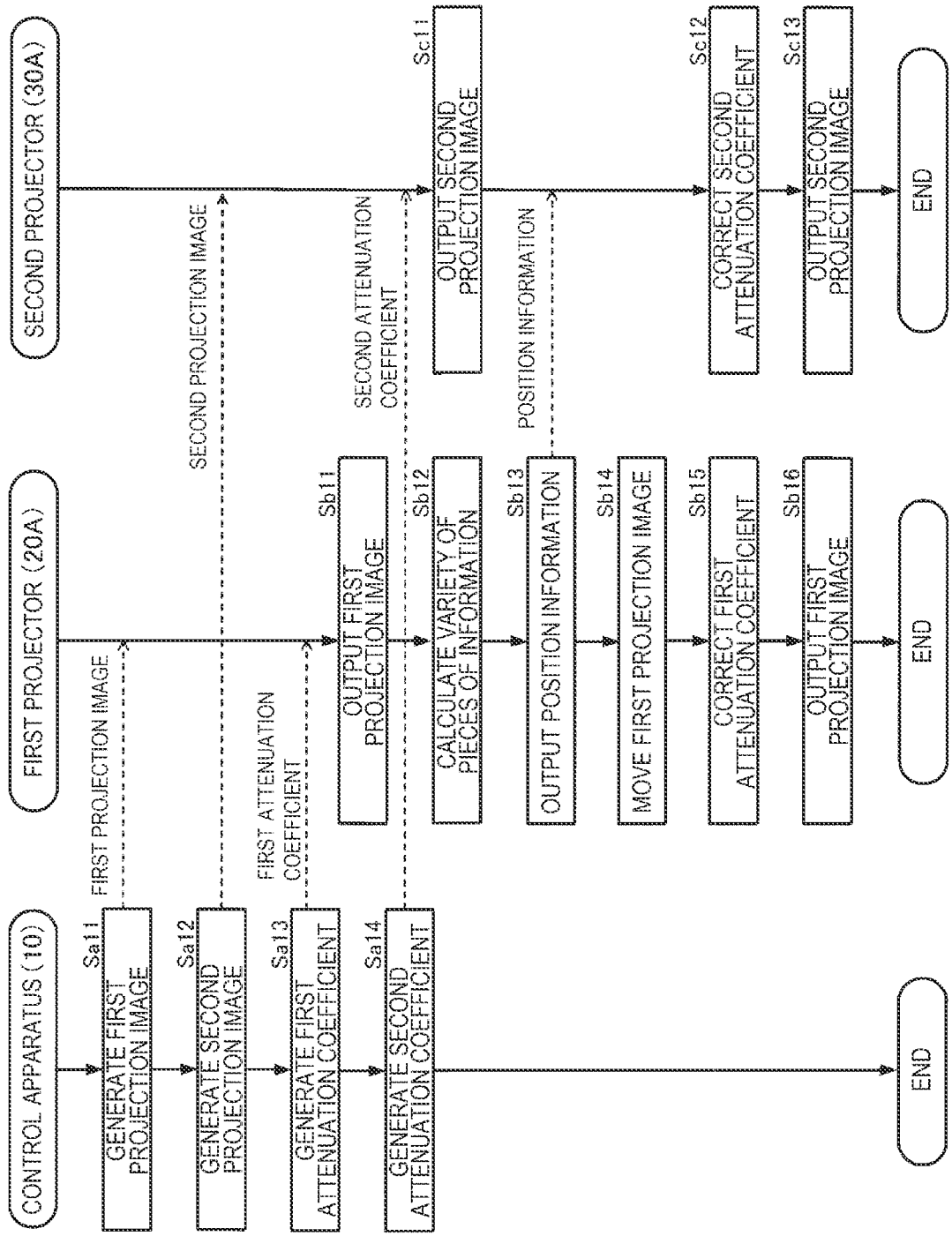
FIG. 14 is a sequence chart showing an example of the action of the projection system.

The action of the projection system 1A will next be described. FIG. 14 is a sequence chart showing an example of the action of the projection system 1A. The actions of the third projector 40A and the fourth projector 50A are omitted in FIG. 14 for simplicity of the description. The actions of the third projector 40A and the fourth projector 50A are basically the same as the action of the second projector 30A. In the aspects presented below by way of example, an element having the same effect and function as that in the first embodiment has the same reference character used in the description of the first embodiment, and no detailed description of the same element will be made as appropriate.

In step Sa11, the processing apparatus 11 of the control apparatus 10 functions as the first image generator 111 to generate the first projection image. The processing apparatus 11 of the control apparatus 10 functions as the information output section 115 to output the generated first projection image to the first projector 20A.

In step Sa12, the processing apparatus 11 of the control apparatus 10 functions as the second image generator 112 to generate the second projection image. The processing apparatus 11 of the control apparatus 10 functions as the information output section 115 to output the generated second projection image to the second projector 30A.

In step Sa13, the processing apparatus 11 of the control apparatus 10 functions as the first attenuation coefficient generator 113 to generate the first attenuation coefficient. The processing apparatus 11 of the control apparatus 10 functions as the information output section 115 to output the generated first attenuation coefficient to the first projector 20A.

In step Sb11, the processing apparatus 23A of the first projector 20A functions as the first attenuator 232 to attenuate the brightness of an image out of the first projection image, the image at the location corresponding to the superimposed region 71 in the first display image 81, by using the first attenuation coefficient in accordance with the position in the superimposed region 71. The processing apparatus 23A functions as the first attenuator 232 to store in the storage 24 the first projection image in which the brightness of the image at the location corresponding to the superimposed area 71 is attenuated. The processing apparatus 23A functions as the double-speed reader 236 to read the first projection image written to the storage 24 from the storage 24 at a speed higher than the write speed. Furthermore, the processing apparatus 23A functions as the image output section 237 to output the first projection image read by the double-speed reader 236 to the projection apparatus 22. As a result, the first display image 81 is displayed on the display surface 70.

In step Sa14, the processing apparatus 11 of the control apparatus 10 functions as the second attenuation coefficient generator 114 to generate the second attenuation coefficient. The processing apparatus 11 of the control section 10 functions as the information output section 115 to output the generated second attenuation coefficient to the second projector 30A.

In step Sc11, the processing apparatus 33A of the second projector 30A functions as the second attenuator 332 to attenuate the brightness of an image out of the second projection image, the image at the location corresponding to the superimposed region 71 in the second display image 82, by using the second attenuation coefficient in accordance with the position in the superimposed region 71. The processing apparatus 33A functions as the second attenuator 332 to store in the storage 34 the second projection image in which the brightness of the image at the location corresponding to the superimposed area 71 is attenuated. The processing apparatus 33A functions as the double-speed reader 333 to read the second projection image written to the storage 34 from the storage 34 at a speed higher than the write speed. Furthermore, the processing apparatus 33A functions as the image output section 334 to output the second projection image read by the double-speed reader 333 to the projection apparatus 32. As a result, the second display image 82 is displayed on the display surface 70.

In step Sb12, the processing apparatus 23A of the first projector 20A functions as the calculator 233A to calculate the displacement information on the position of the first projector 20A based on the output signal from the sensor 21. Furthermore, the processing apparatus 23A functions as the calculator 233A to calculate the position information on the position of the superimposed area 71 on the display surface 70 by using the calculated displacement information and the layout information stored in the storage 24.

In step Sb13, the processing apparatus 23A of the first projector 20A functions as the information output section 238 to output the position information calculated by the calculator 233A to the second projector 30A via the communication apparatus 25.

In step Sb14, the processing apparatus 23A of the first projector 20A functions as the image mover 234 to move the first projection image in the liquid crystal panel. As a result, when the position of the first projector 20A is displaced from the reference position, the first display image 81 moves on the display surface 70 in the direction opposite to the direction of displacement in accordance with the amount of displacement.

In step Sb15, the processing apparatus 23A of the first projector 20A functions as the corrector 235 to correct the first attenuation coefficient in accordance with the displacement information.

In step Sb16, the processing apparatus 23A of the first projector 20A functions as the first attenuator 232 to attenuate the brightness of an image out of the first projection image, the image at the location corresponding to the newly superimposed region in the first display image 81, by using the corrected first attenuation coefficient in accordance with the position in the newly superimposed region. The processing apparatus 23A functions as the first attenuator 232 to store in the storage 24 the first projection image in which the brightness of the image at the location corresponding to the newly superimposed area is attenuated. The processing apparatus 23A functions as the double-speed reader 236 to read the first projection image written to the storage 24 from the storage 24 at a speed higher than the write speed. Furthermore, the processing apparatus 23A functions as the image output section 237 to output the first projection image read by the double-speed reader 236 to the projection apparatus 22. As a result, the new first display image 84 is displayed on the display surface 70.

In step Sc12, the processing apparatus 33A of the second projector 30A functions as the corrector 336 to correct the second attenuation coefficient in accordance with the position information.

In step Sc13, the processing apparatus 33A of the second projector 30A functions as the second attenuator 332 to maintain or attenuate the brightness of the image at the location corresponding to the original superimposed region in the second display image 82 by using the corrected second attenuation coefficient in accordance with the position in the original superimposed region. The processing apparatus 33A functions as the second attenuator 332 to store in the storage 34 the second projection image in which the brightness of the image at the location corresponding to the original superimposed area is changed. The processing apparatus 33A functions as the double-speed reader 333 to read the second projection image written to the storage 34 from the storage 34 at a speed higher than the write speed. Furthermore, the processing apparatus 33A functions as the image output section 334 to output the second projection image read by the double-speed reader 333 to the projection apparatus 32. As a result, a new second display image 85 is displayed on the display surface 70.

2-5. Effects Provided by Second Embodiment

In the image displaying method according to the present embodiment, the calculator 233A calculates the position information on the position of the superimposed area 71 on the display surface 70 based on the displacement information on the position of the first projector 20A. The information output section 238 then transmits the calculated position information to the second projector 30A. The corrector 336 of the second projector 30A corrects the second attenuation coefficient by using the position information acquired from the first projector 20A.

When the first display image 81 swings downward, for example, simply shifting the gain curve representing the gain of the first display image 81 to adjust the brightness of the first display image 81 causes the sum of the gain of the first display image 81 and the gain of the second display image 82 not to be constant at some locations. To avoid the problem described above, the information output section 238 transmits the position information described above to the second projector 30A, and the second projector 30A adjusts the gain curve representing the gain of the second display image 82, whereby the sum of the gain of the first display image 81 and the gain of the second display image 82 can be constant at all locations.

The projection system 1A according to the present embodiment includes the first projector 20A, which displays the first display image 81 on the display surface 70, and the second projector 30A, which displays the second display image 82 on the display surface 70. In the first projector 20A, when the position of the first projector 20A is the reference position, the first attenuator 232 attenuates the brightness of an image out of the first display image 81, the image corresponding to the superimposed area 71, where the first display image 81 and the second display image 82 are partially superimposed on each other on the display surface 70, based on the first attenuation coefficient specified in accordance with the position in the superimposed area 71. Thereafter, when the position of the first projector 20A is displaced from the reference position, the calculator 233A calculates the position information on the position of the superimposed area 71 on the display surface 70 in accordance with the displacement information on the displacement of the first projector 20A calculated based on the output signal from the sensor 21. The information output section 238 then outputs the position information to the second projector 30A. The corrector 235 then corrects the first attenuation coefficient in accordance with the displacement information. Thereafter, when the position of the first projector 20A is displaced from the reference position, the first attenuator 232 attenuates the brightness of the image corresponding to the superimposed area 71, 73, or 74 out of the first display image 81 based on the corrected first attenuation coefficient. In the second projector 30A, the second attenuator 332 attenuates the brightness of the image corresponding to the superimposed area 71, 73, or 74 out of the second display image 82 based on a second attenuation coefficient specified in accordance with the position in the superimposed area 71, 73, or 74. The information acquirer 335 then acquires the position information. The corrector 336 then corrects the second attenuation coefficient in accordance with the position information. Finally, the second attenuator 332 attenuates the brightness of the second display image 82 based on the corrected second attenuation coefficient.

When the first display image 81 swings downward, for example, simply shifting the gain curve representing the gain of the first display image 81 to adjust the brightness of the first display image 81 causes the sum of the gain of the first display image 81 and the gain of the second display image 82 not to be constant at some locations. To avoid the problem described above, the information output section 238 transmits the position information described above to the second projector 30A, and the second projector 30A adjusts the gain curve representing the gain of the second display image 82, whereby the sum of the gain of the first display image 81 and the gain of the second display image 82 can be constant at all locations.

3. Variations

The present disclosure is not limited to the embodiments presented above by way of example. Specific aspects of the changes will be presented below by way of example. Two or more aspects arbitrarily selected from the following examples may be combined with each other.

3-1. Variation 1

In the projection systems 1 and 1A according to the first and second embodiments described above, the control apparatus 10, the first projector 20 or 20A, and the second projector 30 or 30A are units separate from one another. In the present embodiment, however, the control apparatus 10 may be incorporated in the first projector 20 or 20A so that the control apparatus 10 and the first projector 20 or 20A operate in the same enclosure. Similarly, in the present embodiment, the control apparatus 10 may be incorporated in the second projector 30 or 30A so that the control apparatus 10 and the second projector 30 or 30A operate in the same enclosure. The first projector 20 or 20A and the second projector 30 or 30A may incorporate only part of the components provided in the control apparatus 10 as components of the projectors themselves. For example, the first projector 20 or 20A may incorporate only the first attenuation coefficient generator 113 out of the components provided in the control apparatus 10 as a component of the first projector itself. Similarly, the second projector 30 or 30A may incorporate only the second attenuation coefficient generator 114 out of the components provided in the control apparatus 10 as a component of the second projector itself.

3-2. Variation 2

In the first embodiment, unlike the first projector 20, the second projector 30 does not include the sensor 21 or the image mover 234, and may include components corresponding thereto. The second projector 30 may then correct a positional shift of the second display image 82 on the display surface 70 by independently correcting the position of the second projection image in the liquid crystal panel.

3-3. Variation 3

In the second embodiment, only the first projector 20A includes the sensor 21, the calculator 233A, the image mover 234, and the information output section 238, and only the second projector 30A includes the information acquirer 335. The first projector 20A may instead include a component corresponding to the information acquirer 335, and the second projector 30A may include components corresponding to the sensor 21, the calculator 233A, the image mover 234, and the information output section 238. That is, the first projector 20A and the second projector 30A may have the same configuration.

3-4. Variation 4

In the first and second embodiments, the first attenuator 232 writes the first projection image to the storage 24, and the double-speed reader 236 reads the first projection image written to the storage 24. Similarly, the second attenuator 332 writes the second projection image to the storage 34, and the double-speed reader 333 reads the second projection image written to the storage 34. The projection image writing and reading timings are, however, not limited to those described above. For example, the superimposition section 231 or 331 may write a projection image on which a superimposition image has been superimposed to the storage 24 or 34, and then the double-speed reader 236 or 333 may read the projection image written to the storage 24 or 34.

3-5. Variation 5

In the first and second embodiments, the first attenuator 232 writes to the storage 24 the first projection image in which the brightness of the image at the location corresponding to the superimposed area 71 is attenuated. When the position of the first projector 20 is displaced from the reference position, the image mover 234 moves the first projection image in the liquid crystal panel in such a way that the first display image 81 moves on the display surface 70 in the direction opposite to the direction of displacement in accordance with the amount of displacement. The double-speed reader 236 then reads the first projection image written to the storage 24 from the storage 24. The processing performed on the first projection image in the present embodiment is, however, not limited to the processing described above. For example, after the image mover 234 corrects a shift of the first display image 81, geometric correction may be performed on the first projection image. The "geometric correction" used herein is a technology for correcting the outer shape of the projection image in advance to suppress distortion of the display image due to the positional relationship between the projector and the display surface 70 and the angle of projection.

When the geometric correction is performed, it is preferable to correct the brightness of the area corresponding to the superimposed area 71 out of the first projection image after the double-speed reader 236 reads the first projection image from the storage 24.

In the embodiments presented above by way of example, the first projector 20 or 20A includes the sensor 21, but not necessarily in the present disclosure. For example, the first projector 20 or 20A may not include the sensor 21, and an inertial sensor separate from the first projector 20 or 20A may be fixed to the enclosure that is not shown but is part of the first projector 20 or 20A. In this case, the first projector 20 or 20A may acquire the output value from the inertial sensor via the communication apparatus 25.

In the embodiments described above, the configuration in which the projection apparatus 22 of the first projector 20 or 20A includes a liquid crystal panel is presented by way of example, but not necessarily in the present disclosure. For example, the projection apparatus 22 may include a digital mirror device (DMD) in place of the liquid crystal panel. In this case, the DMD is an example of the display panel.

What is claimed is:

1. A display method comprising:
   attenuating brightness of an image corresponding to a superimposed area of a first image displayed by a projector on a display surface when a position of the projector is a reference position, the superimposed area being an area where the first image and a second image displayed by another projector are partially superimposed on each other on the display surface, based on a first attenuation coefficient specified in accordance with a position in the superimposed area;
   obtaining a corrected first attenuation coefficient by correcting the first attenuation coefficient, when the position of the projector is displaced from the reference position, in accordance with displacement information on displacement of the projector, the displacement information calculated based on an output signal from an inertial sensor fixed to the projector; and
   attenuating the brightness of the image corresponding to the superimposed area of the first image based on the corrected first attenuation coefficient when the position of the projector is displaced from the reference position.

2. The display method according to claim 1,
wherein the displacement information contains an amount of displacement representing magnitude of the displacement of the projector and a direction of displacement representing a direction of the displacement of the projector, and
when the position of the projector is displaced from the reference position, the first image moves in a direction opposite to the direction of displacement in accordance with the amount of displacement.

3. The display method according to claim 1, further comprising
transmitting position information on a position of the superimposed area on the display surface, the position information calculated in accordance with the displacement information, to the other projector.

4. The display method according to claim 1,
wherein the first attenuation coefficient is a ratio of the brightness of the image corresponding to the superimposed area of the first image to the brightness of an image corresponding to an area excluding the superimposed area of the first image,
a second attenuation coefficient is a ratio of the brightness of an image corresponding to the superimposed area of the second image to the brightness of an image corresponding to an area excluding the superimposed area of the second image, and
a sum of the first and second attenuation coefficients is one.

5. A projector comprising one or more chips programmed to
attenuate brightness of an image corresponding to a superimposed area of a first image displayed by a projector on a display surface when a position of the projector is a reference position, the superimposed area being an area where the first image and a second image displayed by another projector are partially superimposed on each other on the display surface, based on a first attenuation coefficient specified in accordance with a position in the superimposed area,
obtain a corrected first attenuation coefficient by correcting the first attenuation coefficient, when the position of the projector is displaced from the reference position, in accordance with displacement information on displacement of the projector, the displacement information calculated based on an output signal from an inertial sensor fixed to the projector, and
attenuate the brightness of the image corresponding to the superimposed area of the first image based on the corrected first attenuation coefficient when the position of the projector is displaced from the reference position.

6. A projection system comprising:
a first projector that displays a first image on a display surface; and
a second projector that displays a second image on the display surface,
wherein the first projector includes a processing apparatus programmed to
attenuate brightness of an image corresponding to a superimposed area of a first image when a position of the first projector is a reference position, the superimposed area being an area where the first image and the second image are partially superimposed on each other on the display surface, based on a first attenuation coefficient specified in accordance with a position in the superimposed area,
obtain a corrected first attenuation coefficient by correcting the first attenuation coefficient, when the position of the first projector is displaced from the reference position, in accordance with displacement information on displacement of the first projector, the displacement information calculated based on an output signal from an inertial sensor fixed to the first projector; and
attenuate the brightness of the image corresponding to the superimposed area of the first image based on the corrected first attenuation coefficient when the position of the first projector is displaced from the reference position.

* * * * *